(12) United States Patent
Kwon et al.

(10) Patent No.: US 12,499,042 B2
(45) Date of Patent: Dec. 16, 2025

(54) MEMORY CONTROLLER PERFORMING RESOURCE ALLOCATION FOR MULTIPLE USERS, STORAGE DEVICE INCLUDING THE SAME, AND OPERATING METHOD OF MEMORY CONTROLLER

(71) Applicant: Samsung Electronics Co., Ltd., Suwon-si (KR)

(72) Inventors: Seongnam Kwon, Suwon-si (KR); Soojun Im, Suwon-si (KR); Jiyeun Kang, Suwon-si (KR); Seokyoung Ko, Suwon-si (KR); Youngho Park, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 18/756,420

(22) Filed: Jun. 27, 2024

(65) Prior Publication Data

US 2025/0199951 A1 Jun. 19, 2025

(30) Foreign Application Priority Data

Dec. 18, 2023 (KR) .......................... 10-2023-0185081

(51) Int. Cl.
*G06F 12/02* (2006.01)

(52) U.S. Cl.
CPC .. *G06F 12/0246* (2013.01); *G06F 2212/7201* (2013.01)

(58) Field of Classification Search
CPC ............... G06F 12/0246; G06F 2212/7201
See application file for complete search history.

(56) References Cited

U.S. PATENT DOCUMENTS

| | | | |
|---|---|---|---|
| 10,833,940 B2 | 11/2020 | Cencini et al. | |
| 11,422,931 B2 | 8/2022 | Li | |
| 2018/0060228 A1* | 3/2018 | Arai | G06F 3/0688 |
| 2020/0089537 A1* | 3/2020 | Bahirat | G06F 9/468 |
| 2022/0137819 A1 | 5/2022 | Dong et al. | |
| 2022/0147392 A1 | 5/2022 | Choi et al. | |
| 2023/0153019 A1* | 5/2023 | Ma | G06F 11/1076 |
| | | | 711/103 |

FOREIGN PATENT DOCUMENTS

| | | | |
|---|---|---|---|
| CN | 115145493 A | 10/2022 | |
| CN | 116126504 A | 5/2023 | |

* cited by examiner

Primary Examiner — Larry T MacKall
(74) Attorney, Agent, or Firm — Fish & Richardson P.C.

(57) ABSTRACT

A memory controller includes processing circuitry configured to, set a resource allocation ratio for multiple users, allocate a plurality of resources to the multiple users based on the resource allocation ratio, the plurality of resources being used by the multiple users to access a memory device, the plurality of resources including at least one independent resource type resource and at least one shared resource type resource, the allocating the plurality of resources including independently allocating the at least one independent resource type resource to the multiple users based on the resource allocation ratio and allocating the at least one shared resource type resource to the multiple users in a time-division manner based on the resource allocation ratio, and perform a fetch operation on memory commands associated with the multiple users based on the allocated plurality of resources to the multiple users, the memory commands being generated by the multiple users.

20 Claims, 20 Drawing Sheets

<< Full isolation >>

MEMORY CONTROLLER PERFORMING RESOURCE ALLOCATION FOR MULTIPLE USERS, STORAGE DEVICE INCLUDING THE SAME, AND OPERATING METHOD OF MEMORY CONTROLLER

CROSS-REFERENCE TO RELATED APPLICATION

This U.S. non-provisional application is based on and claims the benefit of priority under 35 U.S.C. § 119 to Korean Patent Application No. 10-2023-0185081, filed on Dec. 18, 2023, in the Korean Intellectual Property Office, the disclosure of which is incorporated by reference herein in its entirety.

BACKGROUND

Various example embodiments of the inventive concepts relate to a memory controller, and more particularly, to a memory controller performing efficient resource allocation for multiple users, a storage device including the same, an operating method of the memory controller, and/or a non-transitory computer readable medium including computer readable instructions for performing the operating method, etc.

An example of a storage device based on a flash memory device is a solid state drive (SSD). Interfaces used in storage devices, such as SSDs, include a serial advanced technology attachment (SATA) interface, a peripheral component interconnect express (PCIe) interface, a serial attached small computer small interface (SCSI) (SAS), and/or a compute express link (CXL) interface, etc. Interfaces, e.g., a non-volatile memory express (NVMe) interface, based on a PCIe bus have also been suggested.

A storage device may be shared by at least two hosts (e.g., host devices, host computing devices, etc.) and multiple users may access the storage device through each host. Multiple users accessing a storage device may need and/or may desire to fairly share the storage device, but there is a limit to ensuring fairness for multiple users. When multiple users access a storage device, the overall performance of the storage device may degrade if a large workload on the storage device is caused by a malicious user.

SUMMARY

Various example embodiments of the inventive concepts provide a memory controller capable of increasing fairness in the use of a storage device among multiple users that share the storage device and securing and/or improving the performance of the storage device for each user, a storage device including the memory controller, an operating method of the memory controller, and/or a non-transitory computer readable medium including computer readable instructions for performing the operating method, etc.

According to at least one example embodiment of the inventive concepts, there is provided a memory controller including processing circuitry configured to, set a resource allocation ratio for multiple users of at least one host device, allocate a plurality of resources to the multiple users based on the resource allocation ratio, the plurality of resources being used by the multiple users to access a memory device, the plurality of resources including at least one independent resource type resource and at least one shared resource type resource, the allocating the plurality of resources including independently allocating the at least one independent resource type resource to the multiple users based on the resource allocation ratio and allocating the at least one shared resource type resource to the multiple users in a time-division manner based on the resource allocation ratio, and perform a fetch operation on memory commands associated with the multiple users based on the allocated plurality of resources to the multiple users, the memory commands being generated by the multiple users.

According to at least one example embodiment of the inventive concepts, there is provided an operating method of a memory controller. The operating method includes independently allocating command storage space, data buffer space, and memory chips of a memory device to multiple users based on a resource allocation ratio set for the multiple users, storing memory commands associated with each of the multiple users in the command storage space allocated to each of the multiple users, the memory commands being fetched from a host device, storing data from each of the multiple users in the data buffer space allocated to each of the multiple users, and writing the data stored in the data buffer space allocated to each of the multiple users to the memory chips allocated to each of the multiple users, the writing including writing the data to the memory chips using a first memory channel, the first memory channel allocated to each of the multiple users in a time-division manner based on the resource allocation ratio.

According to at least one example embodiment of the inventive concepts, there is provided a storage device including a memory device, the memory device including a first isolation namespace and a second isolation namespace, each of the first and second isolation namespaces including a plurality of memory chips, and at least one resource of the first isolation namespace is independently accessed from resources of the second isolation namespace, the at least one resource of the first isolation namespace and the resources of the second isolation namespace being related to at least one memory operation of the memory device, and processing circuitry configured to, communicate with a host device and control the at least one memory operation of the memory device in response to memory commands from multiple users of the host device, the multiple users including a first user and a second user, allocate all of the memory chips included in the first isolation namespace to the first user in response to the second user not accessing the first isolation namespace, and allocate a subset of the memory chips included in the first isolation namespace to the first user based on a resource allocation ratio set for the first and second users in response to the second user accessing the first isolation namespace.

BRIEF DESCRIPTION OF THE DRAWINGS

Various example embodiments will be more clearly understood from the following detailed description taken in conjunction with the accompanying drawings in which.

DETAILED DESCRIPTION

Hereinafter, various example embodiments will be described in detail with reference to the accompanying drawings.

Figure 1:
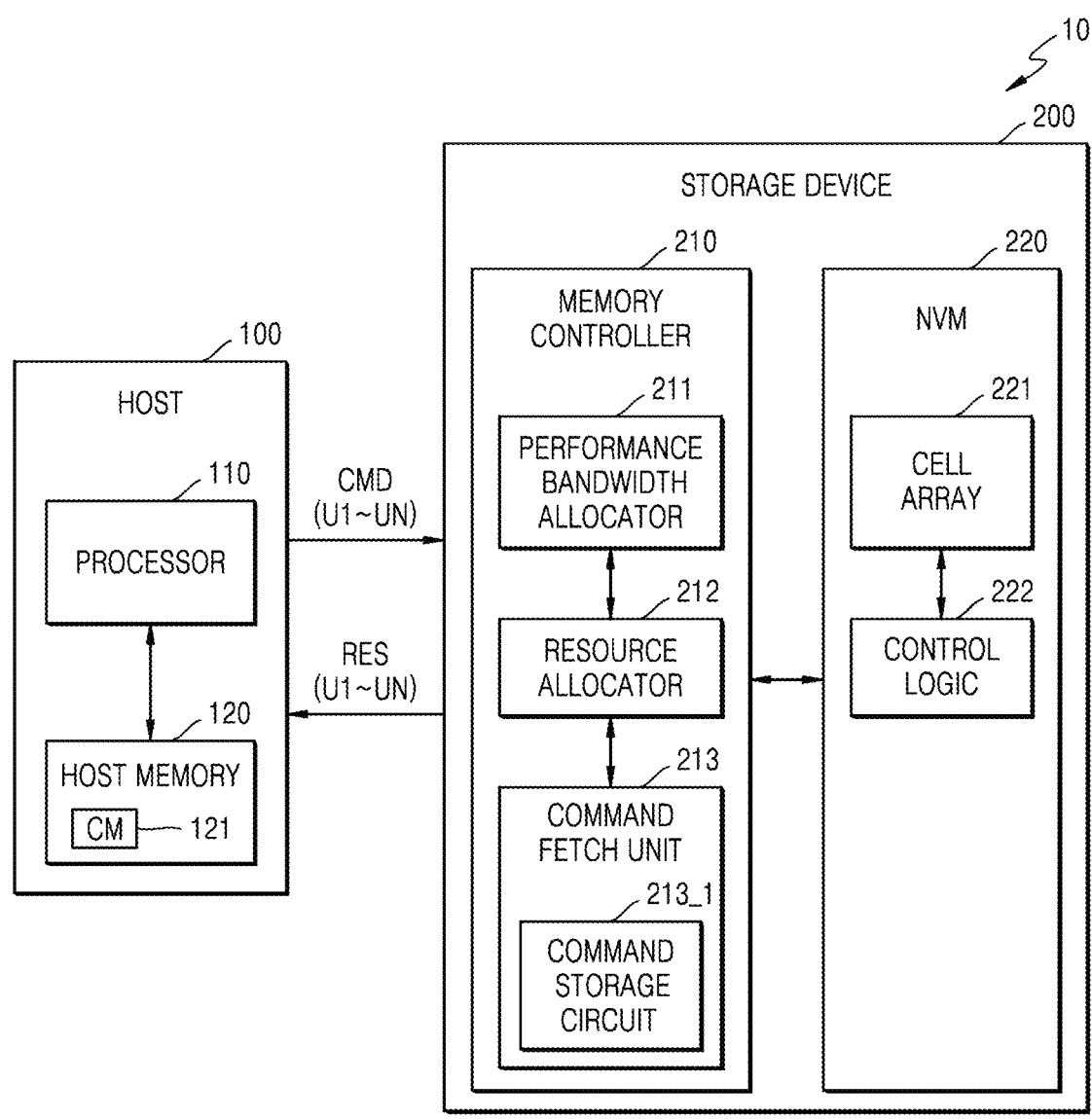
FIG. 1 is a block diagram of a data processing system including a storage device, according to at least one example embodiment.

FIG. 1 is a block diagram of a data processing system including a storage device, according to at least one example embodiment.

Referring to FIG. 1, a data processing system 10 may include a host 100 (e.g., a host device, a host computing device, etc.) and a storage device 200, etc., but the example embodiments are not limited thereto, and for example, the data processing system 10 may include a greater or lesser number of constituent elements. The storage device 200 may include non-volatile memory (NVM) as a memory device 220 and a memory controller 210 controlling the memory device 220, etc. Multiple users U1 to UN may share the storage device 200 and may provide a request (and/or a command) to perform a memory operation (e.g., write data, read data, erase data, etc.) to the storage device 200 through the host 100. Although only one host 100 is illustrated in FIG. 1, at least two hosts may share the storage device 200.

In at least one example embodiment, the memory controller 210 and the memory device 220 may be respectively implemented in separate semiconductor chips. According to at least one example embodiment, the elements of the inventive concepts may be defined as other various terms. For example, the storage device 200 may be referred to as a memory system, a storage system, etc., and the memory controller 210 may be referred to as a storage controller, etc.

The storage device 200 may include non-transitory storage media that stores data according to at least one request received from the host 100. For example, the storage device 200 may include at least one solid state drive (SSD), but is not limited thereto. When the storage device 200 includes an SSD, the memory device 220 may include a plurality of flash memory chips (e.g., NAND chips) that store data in a non-volatile manner, but the example embodiments are not limited thereto.

The storage device 200 may include various types of memory. For example, the storage device 200 may include NVM, such as magnetic RAM (MRAM), spin-transfer torque MRAM, conductive bridging RAM (CBRAM), ferroelectric RAM (FeRAM), phase-change RAM (PRAM), resistive RAM, nanotube RAM, polymer RAM (PoRAM), nano floating gate memory (NFGM), holographic memory, molecular electronics memory, and/or an insulator resistance change memory, etc.

The storage device 200 may communicate with the host 100 through various interfaces. For example, the storage device 200 may communicate with the host 100 through various interfaces, such as a universal serial bus (USB) interface, a multimedia card (MMC) interface, a peripheral component interconnect express (PCIe) interface, an advanced technology attachment (ATA), a serial ATA (SATA) interface, a parallel ATA (PATA) interface, a small computer system interface (SCSI), a serial attached SCSI (SAS), an enhanced small disk interface (ESDI), an integrated drive electronics (IDE) interface, a compute express link (CXL) interface, and/or an NVM express (NVMe) interface, etc.

According to at least one example embodiment, the host 100 may include at least one processor 110 and/or a host memory 120, etc. The processor 110 may generally control operations of the host 100 by executing software (e.g., computer readable instructions, etc.) stored in the host memory 120. The host 100 may encode and/or decode at least one packet (e.g., data packet, etc.) that satisfies and/or conforms to a standard defined by a certain and/or desired interface. The host 100 may, for example, generate, as a command CMD, a packet instructing the storage device 200 to perform a memory operation, such as a write and/or read operation, etc. The host 100 may also receive a response RES from the storage device 200 in response to the memory operation command, etc. According to some example embodiments, the at least one processor 110 and/or the host memory 120, etc., may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The host 100 may include a command memory (CM) 121 storing the command CMD and a response memory (not shown) storing the response RES, but the example embodiments are not limited thereto. Although it is illustrated in FIG. 1 that the CM 121 is included in the host memory 120, the example embodiments are not limited thereto, and for example, the CM 121 may be implemented as a separate memory in the host 100. The response memory may be included in the host memory 120 and/or implemented as a separate memory. The host 100 may store commands CMD, which are generated by the users U1 to UN, in the CM 121. For example, the CM 121 may include multiple queues storing multiple commands CMD and the queues may be allocated to the users U1 to UN. For example, when an NVMe interface is applied to the data processing system 10, a command queue may correspond to a submission queue (SQ) defined in the NVMe interface, but the example embodiments are not limited thereto.

In at least one example embodiment, the memory controller 210 may include a performance bandwidth allocator 211, a resource allocator 212, and/or a command fetch unit 213, etc. The memory device 220 may include one or more NAND chips each including a cell array 221 and/or a control logic 222 (e.g., control processing circuitry), etc. For example, the control logic 222 of each NAND chip may perform data write, read, and/or erase, etc., operations under the control of the memory controller 210, etc. The cell array 221 of each NAND chip may include one or more blocks. According to some example embodiments, the memory controller 210, the performance bandwidth allocator 211, the resource allocator 212, and/or the command fetch unit 213, etc., may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The storage device 200 may perform memory operations, such as a write operation, a read operation, etc., by fetching commands CMD from the command queues and executing the fetched commands CMD. A command CMD provided to the storage device 200 may include information about a command queue, and different command queues may be allocated to different users, but the example embodiments are not limited thereto. Accordingly, through the information included in the command CMD, the storage device 200 may identify a user providing the command CMD (e.g., the storage device 200 may determine the user who generated the command CMD, etc.). The command CMD may include information (e.g., a user identification (ID), etc.) indicating a user, in addition to and/or instead of information about a command queue. By checking the user ID, the storage device 200 may identify a user providing the command CMD.

The performance bandwidth allocator 211 may allocate a performance bandwidth to a user. The performance bandwidth may represent data access performance related to data input/output speed and/or a desired data amount which is provided by the storage device 200 for each user, but is not limited thereto. For example, the host 100 may provide the storage device 200 with a command CMD requesting allocation of storage space for a user. The command CMD requesting the allocation may include information about the desired size of the storage space for the user requested by the host 100. For example, a set feature command according to the NVMe interface may include a command requesting allocation of a storage region and the storage device 200 may determine a performance bandwidth for a user in response to the set feature command. Based on the size of storage space requested to be allocated for the users U1 to UN, the performance bandwidth allocator 211 may allocate a performance bandwidth to each of the users U1 to UN and/or allocate a performance bandwidth ratio between the users U1 to UN, etc.

In at least one example embodiment, the host 100 and/or the storage device 200 may set various types of commands CMD by using vendor-specific command(s), but the example embodiments are not limited thereto. For example, a separate command may be defined to transmit performance bandwidth information for each user between the host 100 and the storage device 200. In at least one example embodiment, the performance bandwidth allocator 211 may allocate a performance bandwidth to each of the users U1 to UN and/or allocate a performance bandwidth ratio between the users U1 to UN, according to a command CMD that is specifically defined and/or configured, etc.

The users U1 to UN may be assigned different priorities for accessing the storage device 200 for various reasons, such as different quality of service levels assigned to the users U1 to UN, different fees paid by the users U1 to UN, etc. For example, when a first user and a second user have a priority ratio of 1:2, an allocation operation may be performed such that performance bandwidths of, for example, 1 GB/s and 2 GB/s are respectively set for the first user and the second user, but the example embodiments are not limited thereto. In one or more of the example embodiments described below, a priority may refer to providing different access performance of the storage device 200 to users because of one or more factors, such as the quality of service levels described above and may be a basis for setting allocation of a performance bandwidth and/or resources, but the example embodiments are not limited thereto.

Based on the performance bandwidth allocation result, the resource allocator 212 may allocate various kinds of resources related to the use of the storage device 200 to the users U1 to UN. For example, the resource allocator 212 may allocate the resources to the users U1 to UN at an allocation ratio corresponding to the performance bandwidth ratio such that each of the users U1 to UN may use the storage device 200 according to the performance bandwidth allocated to each user. Examples of resources allocated to the users may include, fetch scheduling for fetching commands CMD associated with the users, allocating storage space to each of the users for storing the commands CMD, allocating buffers to each of the users for temporarily storing data exchanged with the host 100, and/or allocating NAND chips to each of the users of the memory device 220. The resource allocator 212 may allocate these resources to the users U1 to UN.

The command fetch unit 213 may fetch commands CMD stored in command queues of the host 100. For example, the command fetch unit 213 may schedule fetching of commands CMD generated by the users U1 to UN, based on a result of the resource allocation. For example, more commands CMD may be fetched from a user having a higher priority based on the allocation result, or in other words, the order in which commands are fetched from the may be based on the priority levels of the users, etc.

In at least one example embodiment, the command fetch unit 213 may include a command storage circuit 213_1 which stores fetched commands CMD. The command storage circuit 213_1 may include storage space for storing the commands CMD from the users U1 to UN, and the storage space may be allocated to the users U1 to UN based on a resource allocation result. For example, the storage space of the command storage circuit 213_1 may include circuits, which may be physically separated from each other and may be operated independently, and the command storage circuits 213_1 may thus be independently allocated to the users U1 to UN. In other words, as a different performance bandwidth is set for each user, each user may be allocated a different size of storage space in the command storage circuit 213_1, etc.

Similarly, as other resources, a buffer (not shown) inside and/or outside of (e.g., external to) the memory controller 210 and NAND chips of the memory device 220 may also be allocated to the users U1 to UN based on a result of resource allocation. These resources may also be independently allocated for each user. Accordingly, users may be independently allocated different resources and may use the storage device 200 without influencing the performance of the storage device 200. In particular, even when a particular user causes an excessive workload and/or a malicious user attempts to excessively occupy a channel (e.g., a memory channel, etc.), a user who has been allocated an independent resource may use the storage device 200 by using the resource allocated thereto in accordance to a desired and/or allocated performance bandwidth, without having their performance degraded and/or decreased due to the other user(s).

Some resources of the storage device 200 may be shared by the users U1 to UN. To independently allocate the resources, at least one resource may be allocated to the users U1 to UN in a time-division manner, but the example embodiments are not limited thereto. For example, the memory controller 210 and the memory device 220 may exchange data through a plurality of channels and a plurality of NAND chips may be connected to each channel. According to at least one example embodiment, each channel may be connected to NAND chips allocated to at least two users. In the case of a resource, such as a channel, which is being shared, resource allocation may be performed by allocating occupancy time to the users U1 to UN (e.g., assigning different access times to the resource to each of the users). When the first user has twice the resource allocation ratio of the second user according to the allocation of a performance bandwidth, based on, for example, units of 90 ms, a channel occupancy time of 60 ms may be allocated to the first user and a channel occupancy time of 30 ms may be allocated to the second user, etc., but the example embodiments are not limited thereto.

The memory controller 210 may also include at least one processor (e.g., processing circuitry, not shown) that performs general control related to memory operations. The processor of the memory controller 210 may perform at least one operation related to processing of the commands CMD from the users U1 to UN and may correspond to a resource shared by the users U1 to UN. Accordingly, when the processor of the memory controller 210 corresponds to a resource to which one or more of the example embodiments are applied, resource allocation may be performed such that an occupancy time of the processor is allocated to each of the users U1 to UN, as described above.

According to at least one example embodiment, various resources of the storage device 200 may be allocated to each user according to and/or based on a performance bandwidth set for the user. For example, the influence of other users may be decreased and/or minimized by performing independent allocation and/or occupancy time allocation for each user with respect to various resources. In other words, when key resources desired and/or required for a performance bandwidth set for each user are fixedly allocated to the user, the performance bandwidth set for the user may be guaranteed regardless of the workload of other users. As the storage device 200 is increasingly mounted on and/or used in cloud systems, the demand for fairness continues to increase in a multi-user environment. According to at least one example embodiment, the same performance as using an independently occupied storage device may be guaranteed and/or increasingly provided through allocation of resources needed by each user and the demand for fairness between users may be efficiently met.

Although the case where the performance bandwidth of each user is set based on a command from a host is illustrated in the example embodiments described above, the example embodiments are not limited thereto. For example, a storage device may receive, from a host, information about and/or related to a performance bandwidth of each user through a different kind of information (e.g., control information transmitted through another channel than a command/address channel, etc.). Alternatively, and/or additionally, the storage device may predict and/or estimate a performance bandwidth of each user by determining the frequency at which each user generates commands, and may allocate resources based on a result of the prediction and/or estimation.

Figure 2:
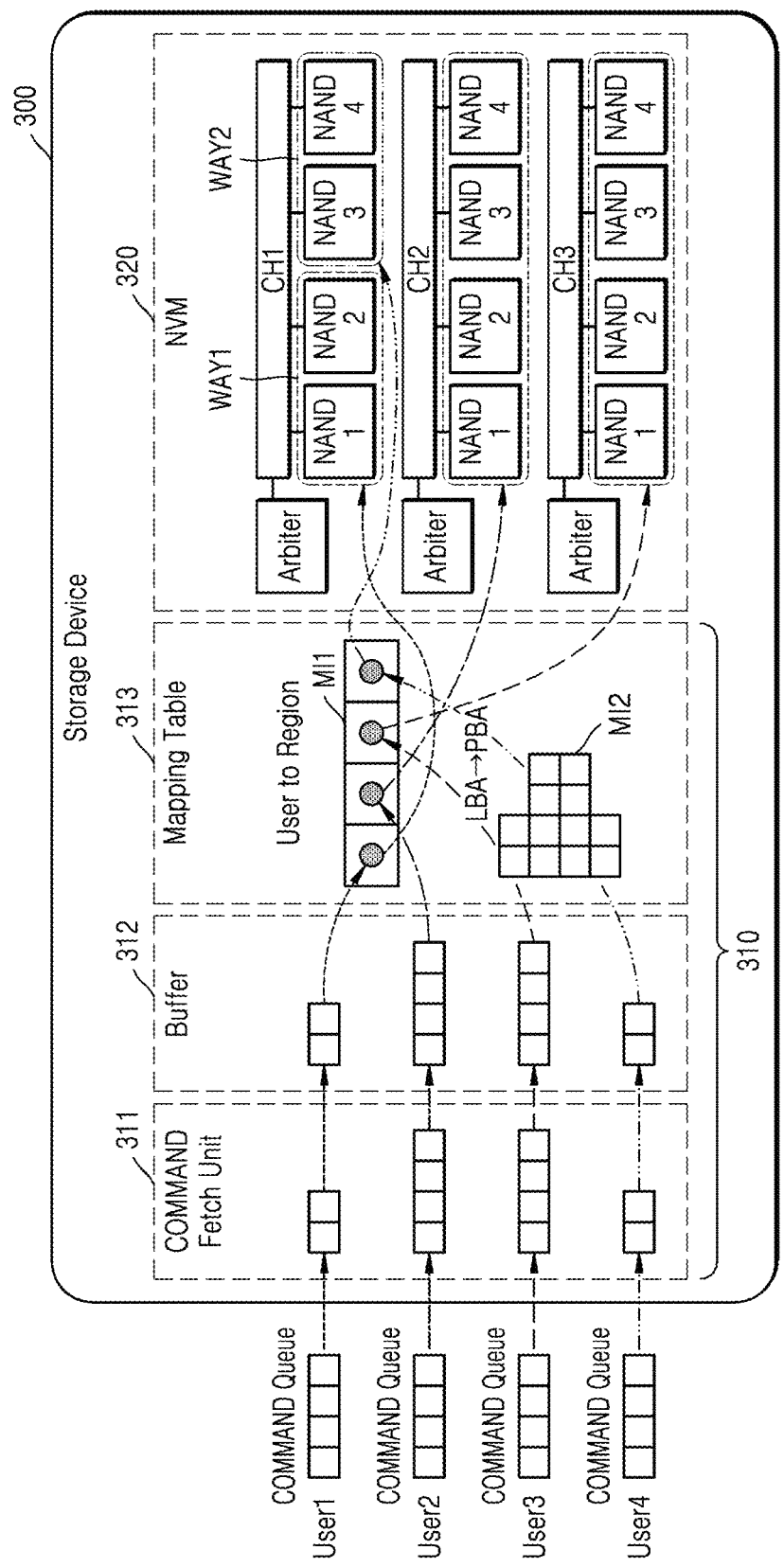
FIG. 2 is a block diagram illustrating implementation of a storage device, according to at least one example embodiment.

FIG. 2 is a block diagram illustrating implementation of a storage device, according to at least one example embodiment. FIG. 2 shows an example case where a storage device 300 includes a memory controller 310 and a memory device 320, which includes a plurality of NAND chips connected to a plurality of channels, but the example embodiments are not limited thereto. The memory controller 310 may include a command fetch unit 311 fetching commands, a buffer 312 temporarily storing data, and/or a mapping table 313 storing first mapping information MI1 related to a storage region allocated to each user and second mapping information MI2 related to logical and physical addresses, etc. Although not shown in FIG. 2, the memory controller 310 may further include various kinds of components, such as a processor generally controlling operations of the storage device 300, according to at least one example embodiment, an interface circuit communicating with the outside (e.g., an external source, etc.), and/or a performance bandwidth allocator, etc. According to some example embodiments, the memory controller 310, command fetch unit 311, buffer 312, mapping table 313, processor, interface circuit, and/or performance bandwidth allocator, etc., may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

Referring to FIG. 2, the command fetch unit 311 may fetch commands, which are generated by multiple users (e.g., first to fourth users User1 to User4, etc.), from command queues of a host. The command fetch unit 311 may schedule command fetch operations on the first to fourth users User1 to User4 based on a result of resource allocation, according to some example embodiments. The command fetch unit 311 may include a command fetch scheduler (not shown), which controls fetching of commands, and/or a command storage circuit (not shown), which stores fetched commands, etc., but is not limited thereto. In at least one example embodiment, resources may be allocated to the first to fourth users User1 to User4 at a ratio of 1:2:2:1, but is not limited thereto. The command fetch scheduler may control the number of commands fetched with respect to each user based on the resource allocation ratio. The storage space of the command storage circuit may be allocated for the first to fourth users User1 to User4 independently at the ratio of 1:2:2:1, but is not limited thereto.

The buffer 312 may store data related to users' access to the storage device 300. Although it is illustrated in FIG. 2 that the buffer 312 is included in the memory controller 310, the buffer 312 may be provided from outside the memory controller 310. Alternatively, and/or additionally, the storage device 300 may further include a data buffer (not shown), which is outside of the memory controller 310 and directly communicates with a host, in addition to the buffer 312 inside the memory controller 310, but the example embodiments are not limited thereto. The data buffer may be allocated to multiple users as a resource, according to some example embodiments.

In at least one example embodiment, the mapping table 313 may store the first mapping information MI1 and/or the second mapping information MI2, etc., but the example embodiments are not limited thereto. For example, when the storage device 300 includes a flash memory device and a flash translation layer (FTL) is employed by the memory controller 310, the mapping table 313 may be stored in RAM in the memory controller 310 and managed by the FTL, etc.

A storage region may be allocated to each user based on various units. For example, when allocation is performed in units of NAND chips and/or NAND dies, each user may be allocated one or more NAND chips or dies. Additionally, a NAND chip may include a plurality of planes each including a plurality of blocks (e.g., memory blocks, etc.), and each user may be allocated one or more planes. The first mapping information MI1 may include mapping information between information (e.g., a user ID) indicating a user and the location of a storage region (e.g., a NAND chip, die, planes, etc.) allocated to the user.

The second mapping information MI2 may include mapping information between a logical address provided by a user and a physical address to which the corresponding data is actually stored. The second mapping information MI2 may be managed in units of pages and/or blocks. When performing a memory operation according to and/or based on a user's command, the storage device 300 may efficiently perform address translation based on the first mapping information MI1 and the second mapping information MI2. For example, with respect to the first user's data access, a NAND chip allocated to the first user among a plurality of NAND chips may be determined based on the first mapping information MI1. A logical address provided by the first user may be translated into a physical address by selectively using information related to the NAND chip allocated to the first user among pieces of information included in the second mapping information MI2.

The memory device 320 may communicate with the memory controller 310 through a plurality of channels (e.g., memory channels, etc.). For example, first to fourth NAND chips NAND1 to NAND4 may be connected to each of first to third channels CH1 to CH3. Each NAND chip may include one die or at least two dies, etc. Although an allocation operation performed in units of NAND chips is illustrated in the following example embodiment, the example embodiments are not limited thereto, and allocation for each user may be performed in die units, or other various units as described above.

When a resource allocation ratio of 1:2:2:1 is set for the first to fourth users User1 to User4, the storage region of the memory device 320 may be allocated to the first to fourth users User1 to User4 according to and/or based on the resource allocation ratio, but the example embodiments are not limited thereto. For example, two NAND chips may be allocated to each of the first user User1 and the fourth user User4, and four NAND chips may be allocated to each of the second user User2 and the third user User3, etc. The first user User1 and the fourth user User4 may share the first channel CH1, etc. As a shared resource, the first channel CH1 may be allocated to the first user User1 and the fourth user User4 based on occupancy time. For example, in one or more example embodiments of FIG. 2, the first user User1 and the fourth user User4 may be allocated the same amount of occupancy time with respect to the first channel CH1 because the first user User1 and the fourth user User4 have the same priority, but the example embodiments are not limited thereto. In the case where the first user User1 and the fourth user User4 have different priorities, the first user User1 and the fourth user User4 may be allocated different amounts of occupancy times with respect to the first channel CH1.

When a plurality of NAND chips are connected to one channel, the memory controller 310 and the memory device 320 may communicate with each other based on an interleaving scheme, but the example embodiments are not limited thereto. For example, a plurality of ways may correspond to one channel. For example, a first way WAY1 and a second way WAY2 may correspond to the first channel CH1, etc. Each way may include at least one NAND chip or die, but is not limited thereto. FIG. 2 shows the case where each way includes two NAND chips, but the example embodiments are not limited thereto.

Memory operations on the first to third channels CH1 to CH3 may be performed independently of each other, and thus may be performed in parallel. This parallel data communication may be referred to as channel interleaving. The first way WAY1 and the second way WAY2 may share the first channel CH1, and accordingly, data input/output of the NAND chips of the first way WAY1 and the second way WAY2 may be performed in an interleaving manner, which may be referred to as way interleaving. An arbiter in FIG. 2 may perform scheduling such that ways are capable of sharing and occupying a channel according to the way interleaving, but the example embodiments are not limited thereto.

According to one or more example embodiments described above, a plurality of NAND chips of the memory device 320 may be independently allocated to multiple users according to and/or based on a result of resource allocation, and other resources may undergo independent allocation and/or occupancy time allocation to secure a performance bandwidth allocated to each user. Accordingly, even when multiple users access the storage device 300, performance allocated to each user may be improved and/or secured, and fairness among the multiple users may be increased and/or ensured.

Figure 3:
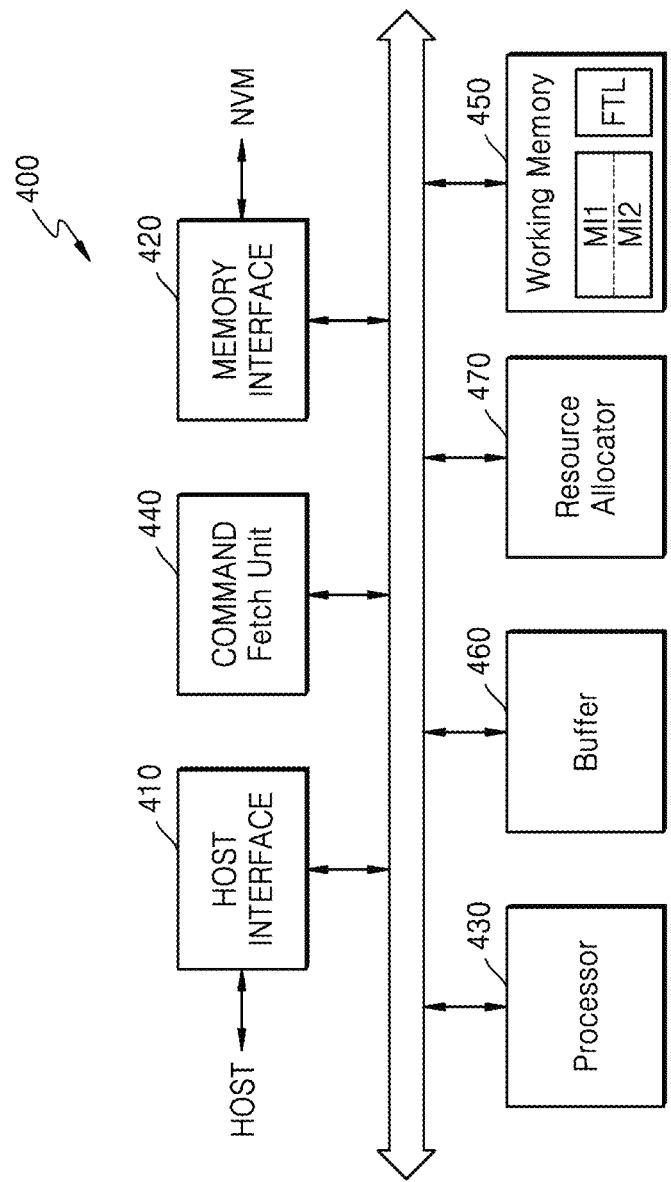
FIG. 3 is a block diagram illustrating implementation of a memory controller, according to at least one example embodiment.

FIG. 3 is a block diagram illustrating implementation of a memory controller, according to at least one example embodiment.

Referring to FIG. 3, a memory controller 400 may include a host interface 410, a memory interface 420, at least one processor 430, a command fetch unit 440, a working memory 450, a buffer 460, and/or a resource allocator 470, etc., but is not limited thereto. In at least one example embodiment, various kinds of software (e.g., computer readable instructions, etc.) executable by the processor 430 may be loaded to the working memory 450. For example, an FTL may be loaded to the working memory 450, etc. The first mapping information MI1 and the second mapping information MI2, which have been described above, may also be stored in the working memory 450 and managed by the FTL. When the functions of the resource allocator 470 according to some example embodiments are implemented by software, a resource allocation module including one or more software programs may be loaded to the working memory 450, etc. The working memory 450 may be implemented in various forms, such as RAM, read-only memory (ROM), electrically erasable programmable ROM (EEPROM), flash memory, and/or other memory technology. According to some example embodiments, the memory controller 400, host interface 410, memory interface 420, at least one processor 430, command fetch unit 440, working memory 450, buffer 460, and/or resource allocator 470, etc., may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The processor 430 may generally control operations of the memory controller 400 by executing various kinds of software stored in the working memory 450. The host interface 410 may communicate with a host through various interfaces, such as an NVMe interface, etc. The memory interface 420 may interface with one or more NAND chips included in a memory device (e.g., NVM, etc.). For example, the memory interface 420 may independently communicate with NAND chips through a plurality of channels, but is not limited thereto.

The command fetch unit 440 may perform a command fetch scheduling function, according to some example embodiments described above, and may store fetched commands. The command fetch unit 440 may control command fetch scheduling based on a resource allocation result, according to some example embodiments. The fetched commands may be processed based on control by the processor 430 of the memory controller 400 and/or a separate internal command processor (not shown), etc., and one or more NAND operations included in each command may be performed.

The buffer 460 may temporarily store data provided from a host and/or data to be provided to the host and may be allocated to multiple users based on a resource allocation result. According to some example embodiments, the storage space of the buffer 460 may be allocated in different sizes to users according to the resource allocation result. According to some example embodiments, the resource allocator 470 may control a resource allocation operation based on performance bandwidths respectively set for the users.

Figure 4:
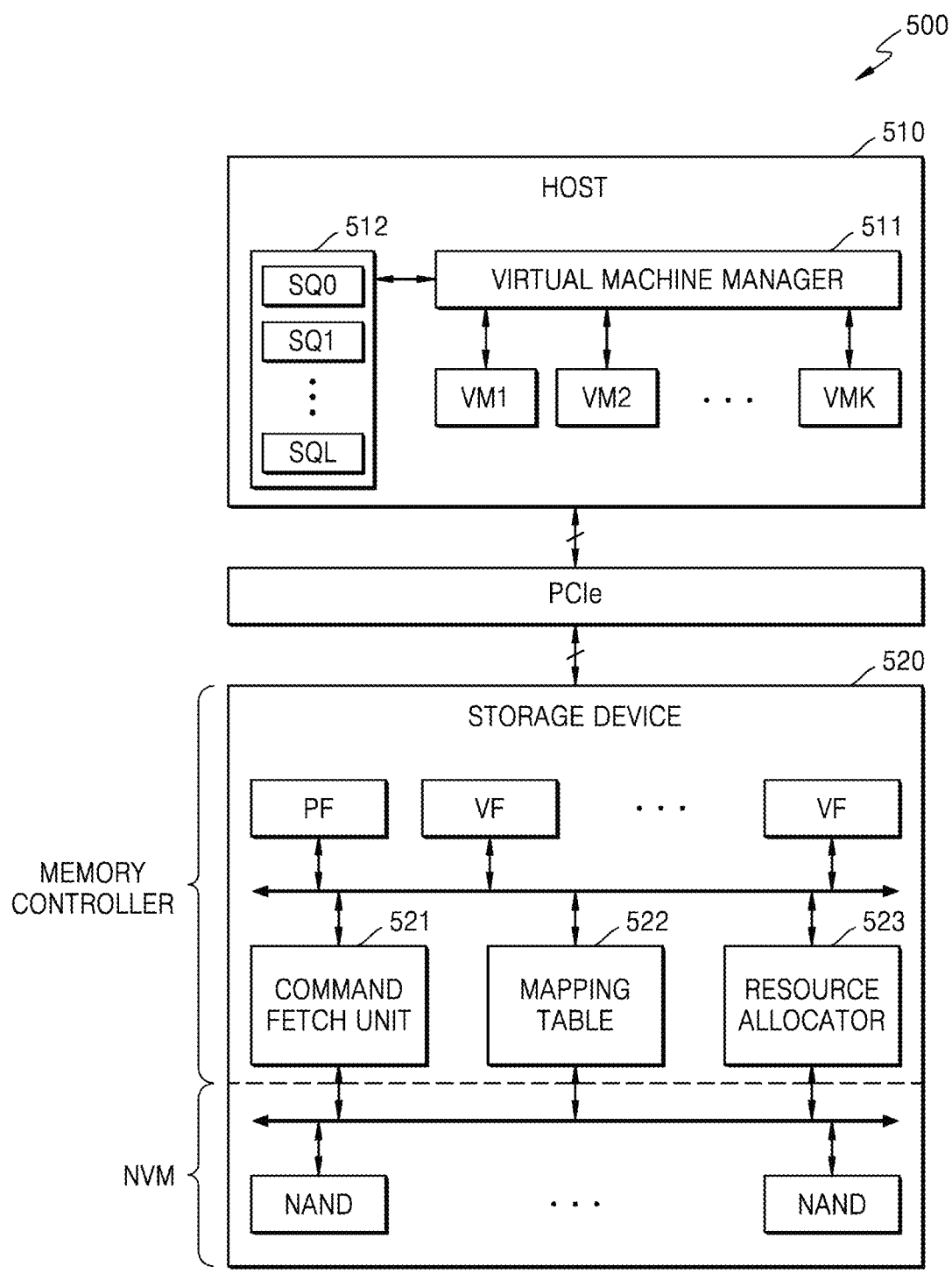
FIG. 4 is a block diagram illustrating specific implementation of a data processing system, according to at least one example embodiment.

FIG. 4 is a block diagram illustrating specific implementation of a data processing system, according to at least one example embodiment. FIG. 4 shows an example case where a host communicates with a storage device through a PCIe bus according to the NVMe interface, but the example embodiments are not limited thereto.

Referring to FIG. 4, a data processing system 500 may include a host 510 (e.g., host device, host computing device, etc.) and a storage device 520, etc. The host 510 may generate, execute, and/or may include a plurality of virtual machines, e.g., first to K-th virtual machines VM1 to VMK, based on virtualization technology. For example, each of the multiple users may be allocated one of the first to K-th virtual machines VM1 to VMK, but the example embodiments are not limited thereto.

The host 510 may include a virtual machine manager 511. The first to K-th virtual machines VM1 to VMK may be generated and/or executed based on control by the virtual machine manager 511. According to the request of a virtual machine, the virtual machine manager 511 may generate a submission queue corresponding to a command queue as described above, and may allocate the submission queue to the virtual machine. For example, the host 510 may include a host memory 512, but is not limited thereto. A plurality of submission queues SQ0 to SQL allocated to multiple users may correspond to at least a portion of the storage space of the host memory 512. However, the example embodiments are not limited thereto. The submission queues SQ0 to SQL may be included in other memory different from the host memory 512. Although only the submission queues SQ0 to SQL storing commands provided to the storage device 520 are illustrated in FIG. 4, completion queues (not shown) storing responses provided from the storage device 520 may be further provided in the host 510, etc.

The storage device 520 may include a memory controller and a memory device (e.g., NVM), etc., but is not limited thereto. The memory controller may include at least one physical function (PF), etc. According to at least one example embodiment, as single root input/output virtualization (SR-IOV) is provided according to the NVMe interface, the storage device 520 may generate at least one virtual function (VF). VFs may be implemented in the memory controller of the storage device 520 in response to a request from the host 510. The PF and the VFs may independently process a data access request from the host 510. Each virtual machine may correspond to one PF or VF, but the example embodiments are not limited thereto. Each user may provide a command to the memory device (e.g., NVM) through a virtual machine, which is allocated to the user, and a PF (or a VF), which corresponds to the virtual machine, etc.

Although not shown in FIG. 4, the memory device (e.g., NVM) may include a plurality of NAND chips. The NAND chips may be classified into and/or assigned to a plurality of namespaces. Each namespace may include one or more channels and one or more NAND chips connected to the included channel(s). For example, the host 510 may send the storage device 520 a request for generation of a namespace to be allocated to a user. The request may include information related to the size of the namespace. In response to the request, the storage device 520 may generate a namespace with a storage space having the desired size according to the request. According to some example embodiments, a performance bandwidth of the user may be determined based on the information related to the size, etc.

In at least one example embodiment, the memory controller of the storage device 520 may include a command fetch unit 521, a mapping table 522, and/or a resource allocator 523, etc. The command fetch unit 521 may schedule commands to be fetched from the host 510, based on a resource allocation result of the resource allocator 523. Although not shown in FIG. 4, the storage device 520 may include various kinds of resources related to processing of commands from users. Some resources may be independently allocated to the users. As the other resources are shared by the users, resource allocation may be performed through time division or the like, according to the priority of the users.

Figure 5:
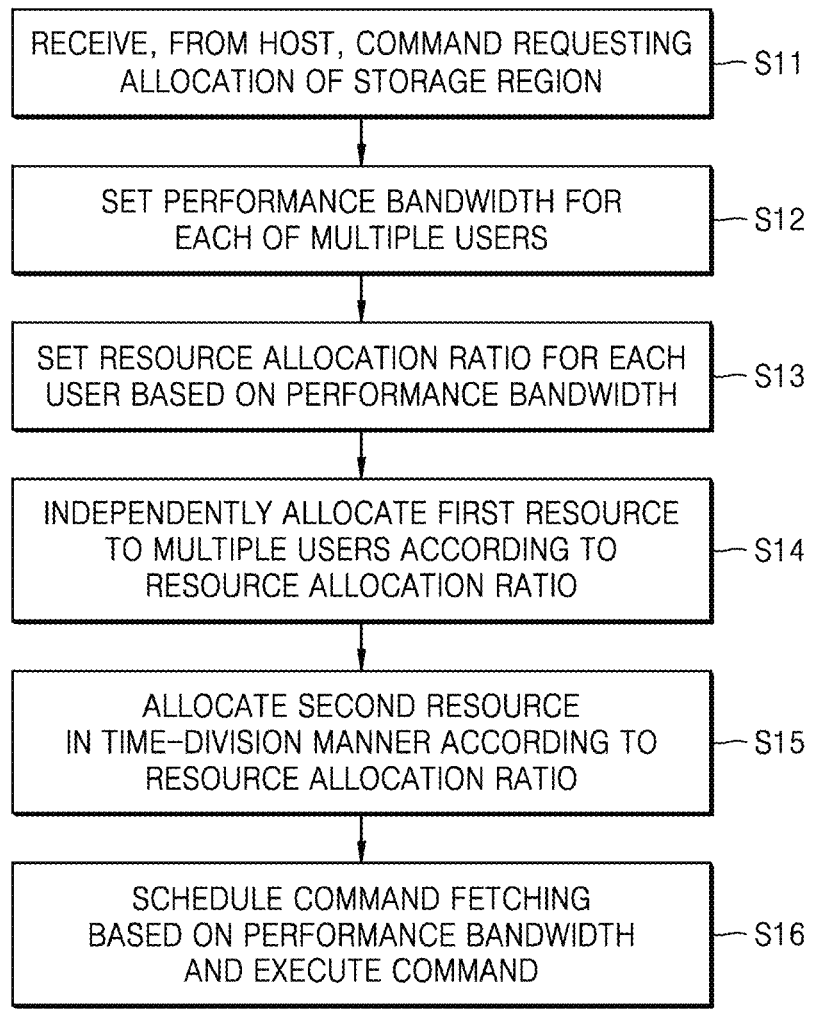
FIGS. 5 and 6 are flowcharts of operating methods of a storage device, according to some example embodiments.
Figure 6:
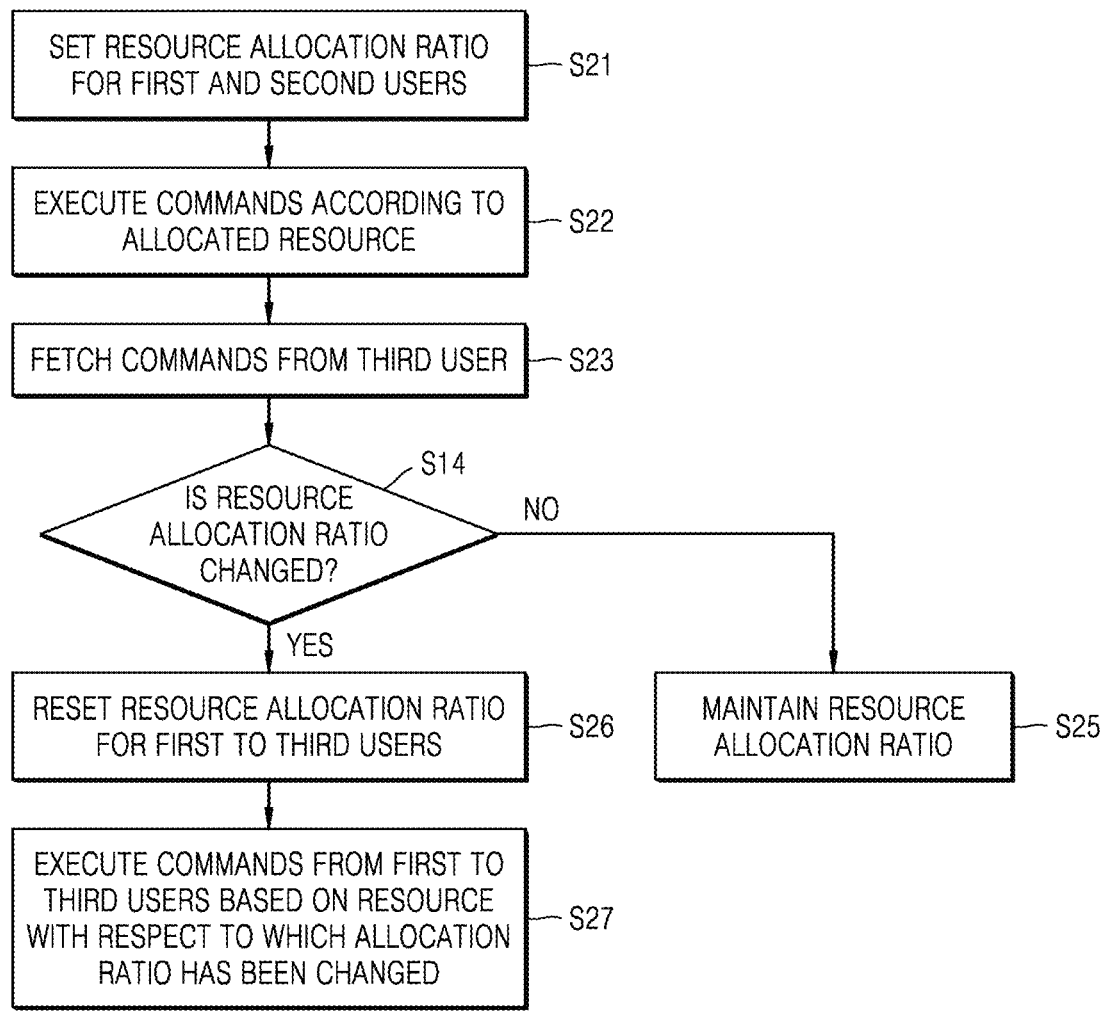

FIGS. 5 and 6 are flowcharts illustrating example operating methods of a storage device, according to some example embodiments.

Referring to FIG. 5, the storage device may include a memory controller and a memory device, but is not limited thereto. The memory controller may communicate with a host according to a desired and/or certain interface, etc. The memory controller may receive, from the host, a command requesting allocation of a storage region of the storage device for each of multiple users in operation S11. For example, the storage region may include a namespace including one or more memory chips (or dies) based on an NVMe interface, but the example embodiments are not limited thereto.

The memory controller may extract information from the command by decoding the command. For example, the memory controller may extract first information related to the size of a storage region requested by the host to be allocated, etc. The host may request allocation of the storage region for the multiple users based on the extracted first information. The memory controller may determine priorities of the multiple users of the storage device based on the priority information included in the first information associated with the multiple users. For example, when the size of a storage region requested to be allocated to the first user is twice the size of a storage region requested to be allocated to the second user, the first user may be determined to have a priority twice the priority of the second user, etc., but the example embodiments are not limited thereto.

The memory controller may set a performance bandwidth for each user based on the first information in operation S12. Based on the set performance bandwidth, the memory controller may set a resource allocation ratio for the multiple users with respect to various resources which are related to memory operations in the storage device in operation 13. The resources may include a first type of resource (e.g., an independent resource type, etc.), such as a storage space and/or a memory chip, etc., which includes physically separable components that may be independently allocated to the multiple users, and/or a second type of resource (e.g., a shared resource type, etc.), such as a processor and/or a channel, etc., which may be shared by the users, etc., but the example embodiments are not limited thereto. According to the resource allocation ratio, the memory controller may independently allocate the first type of resource to the multiple users in operation S14 and may allocate the second type of resource to the multiple users based on a time-division manner in operation S15.

Thereafter, the memory controller may schedule the fetching of commands from the host based on the performance bandwidth associated with each user, and may execute the fetched commands by using a resource allocated to each user in operation S16.

An example of changing resource allocation based on multiple users' access to the storage device is illustrated in FIG. 6, but the example embodiments are not limited thereto.

For example, when there are first to third users of the storage device, at least one resource may be shared by the first to third users and at least one other resource may be shared by some of the first to third users, etc. Additionally, at least one other resource may be independently allocated to the first to third users. For example, when memory chips allocated to the first and second users are connected to a first channel and memory chips allocated to the third user are connected to a second channel, the first and second users may use a channel independently of the third user, etc. While memory chips and the storage space of a buffer may correspond to resources that may be independently allocated to the first to third users, a resource such as a processor may be shared by the first to third users, etc. In at least one example embodiment, a plurality of resources included in a storage device may be allocated to users in various manner.

Allocation of some resources (e.g., a data buffer) of a storage device may be changed based on whether multiple users use the storage device. For example, when only the first and second users use the storage device, the entire storage space of a data buffer may be allocated to the first and second users according to a desired and/or preset ratio. However, when a third user joins in using the storage device and the entire storage space of the data buffer is allocated to the first to third users according to the desired and/or preset ratio, the size of storage space of the data buffer, which is allocated to each user, may be changed.

Referring to FIG. 6, as the first and second users access the storage device, a resource allocation ratio may be set for the first and second users in operation S21. A resource may be allocated to the first and second users according to the set resource allocation ratio. Commands from the first and second users may be executed according to the allocated resource in operation S22. Thereafter, as the third user accesses the storage device, a command provided by the third user may be fetched in operation S23.

The storage device may check various resources allocated to the third user and a resource allocation ratio with respect to the third user and may determine whether to change the resource allocation ratio set for the first and second users according to and/or based on a result of the check in operation S24. When is the storage device determines that the third user's access to the storage device does not use the resource allocated to the first and second users, the resource allocation ratio for the first and second users may be maintained in operation S25. Otherwise, when the storage device determines that the third user's access to the storage device uses the resource allocated to the first and second users, the resource allocation ratio for the first and second users may be changed because the resource needs to be allocated to the third user as well. For example, the resource allocation ratio may be reset for the first to third users according to respective performance bandwidths of the first to third users in operation S26. Commands provided by the first to third users may be executed by the resource with respect to which an allocation ratio has been changed, in operation S27.

Figure 7A:
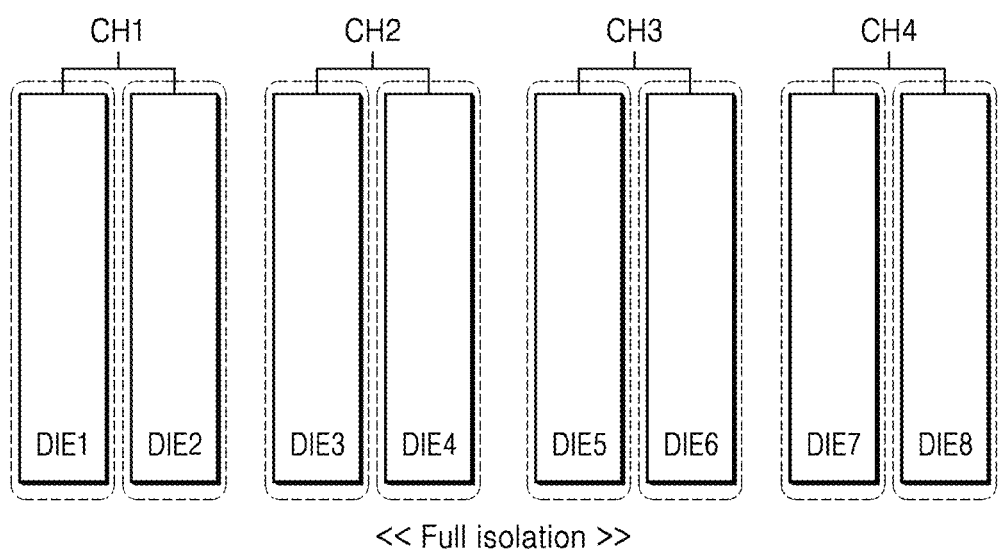
FIGS. 7A, 7B, and 8 are conceptual diagrams of an isolation namespace according to some example embodiments.
Figure 7B:
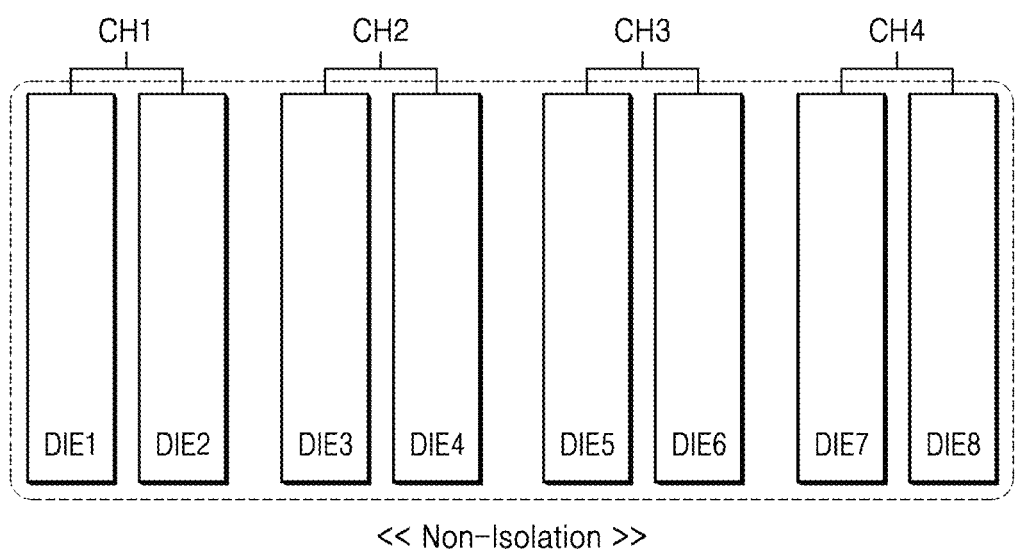
Figure 8:
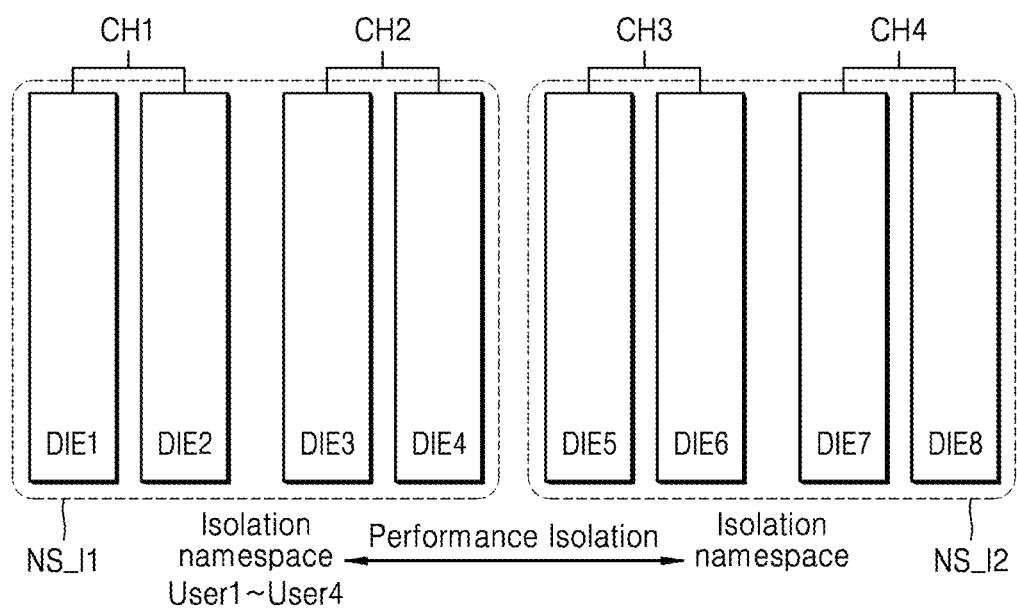

FIGS. 7A, 7B, and 8 are conceptual diagrams of an isolation namespace according to some example embodiments. A memory device may include a plurality of NAND chips. Each NAND chip may include one or more dies. A namespace may be generated in various sizes. For example, by using a NAND chip, a die, etc., as a basic unit, a storage region of an integer multiple of the basic unit may constitute and/or may be included in one namespace, etc. FIGS. 7A, 7B, and 8 illustrate first to fourth channels CH1 to CH4 and first to eighth dies DIE1 to DIE8, wherein two dies are connected to each of the first to fourth channels CH1 to CH4, but the example embodiments are not limited thereto.

FIG. 7A illustrates an example case where namespaces are all isolated from each other according to a full isolation mode, but the example embodiments are not limited thereto. For example, referring to FIG. 7A, one die may constitute and/or be included in one namespace, but the example embodiments are not limited thereto. According to at least one example embodiment, a single user or a relatively small number of users may be allocated to each namespace. A user allocated to one namespace may use a storage device independently of another user allocated to another namespace. Accordingly, the performance impact by other users may be decreased and/or minimized, and user fairness may be increased. However, when there are no other users using the storage device, or only a relatively small number of users use the storage device, a user may use only a resource related to one namespace among the resources of the storage device, and accordingly, there is a limit to fully utilizing the performance of the storage device.

According to a non-isolation mode illustrated in FIG. 7B, the first to eighth dies DIE1 to DIE8 may constitute and/or be included in a namespace without isolating namespaces from each other, but the example embodiments are not limited thereto. The namespace may be allocated to multiple users, and accordingly, each user may use blocks of the first to eighth dies DIE1 to DIE8 and may perform data communication through the first to fourth channels CH1 to CH4, but the example embodiments are not limited thereto. In the at least one example embodiment of FIG. 7B, each of the multiple users may use one or more of the resources of the storage device, and accordingly, a user using the storage device may be provided with high performance access to the storage device and/or may be provided with a high performance bandwidth, etc. However, because a single channel may be shared by multiple users, deterioration and/or decrease in performance may be experienced by some users when the multiple users access the storage device simultaneously, thereby degrading and/or decreasing user fairness.

FIG. 8 illustrates an example of setting an isolation namespace according to at least one example embodiment. An isolation namespace may correspond to a group sharing resources, such as a channel and a NAND chip, but the example embodiments are not limited thereto. Users allocated the same isolation namespace may share resources, such as a NAND chip and a channel, of the isolation namespace, etc. A user allocated to one isolation namespace may use the storage device independently of another user allocated to another isolation namespace.

In at least one example embodiment, the first to fourth dies DIE1 to DIE4 may constitute and/or be included in a first isolation namespace NS_I1, and the fifth to eighth dies DIE5 to DIE8 may constitute and/or be included in a second isolation namespace NS_I2, etc. For example, the first isolation namespace NS_I1 may include the first channel CH1 and the second channel CH2, etc. One user may be allocated blocks included in at least one of the first to fourth dies DIE1 to DIE4 included in the first isolation namespace NS_I1.

For example, assuming that the first isolation namespace NS_I1 is allocated to the first to fourth users User1 to User4, resources related to the first isolation namespace NS_I1 may be allocated to the first to fourth users User1 to User4 according to performance bandwidths respectively set for the first to fourth users User1 to User4. For example, when the priority between the first user User1 and the fourth user User4 is set to 1:2, the blocks of dies included in the first isolation namespace NS_I1 may be allocated to the first user User1 and the fourth user User4 at a ratio of 1:2, but the example embodiments are not limited thereto. When the first user User1 and the fourth user User4 use the first and second channels CH1 and CH2, the first user User1 and the fourth user User4 may be allocated occupancy times for the first and second channels CH1 and CH2 at a ratio of 1:2, but the example embodiments are not limited thereto.

According to some example embodiments of FIGS. 7A to 8, isolation namespaces may be configured with respect to a plurality of NAND chips of a memory device, and resource allocation may be performed with respect to users based on the isolation namespaces. For example, to increase user fairness, the size of each isolation namespace may be set to a relatively small size, and each isolation namespace may be allocated to a small number of users. In contrast, to highly utilize the performance of a storage device, the size of each isolation namespace may be set to a relatively large size and each isolation namespace may be allocated to relatively many users.

According to at least one example embodiment, the size of an isolation namespace may be dynamically changed during the operation of a storage device. For example, the storage device may identify a user that has provided a command from the command fetched from a host and may monitor the number of users accessing the storage device. When the storage device determines that a relatively small number of users (and/or less than a certain reference value) access the storage device, the size of an isolation namespace may be increased by the storage device to increase and/or provide high performance to each user. Additionally, when the storage device determines that a relatively large number of users access the storage device, the storage device may decrease the size of an isolation namespace to increase and/or ensure fairness among many users.

Figure 9:
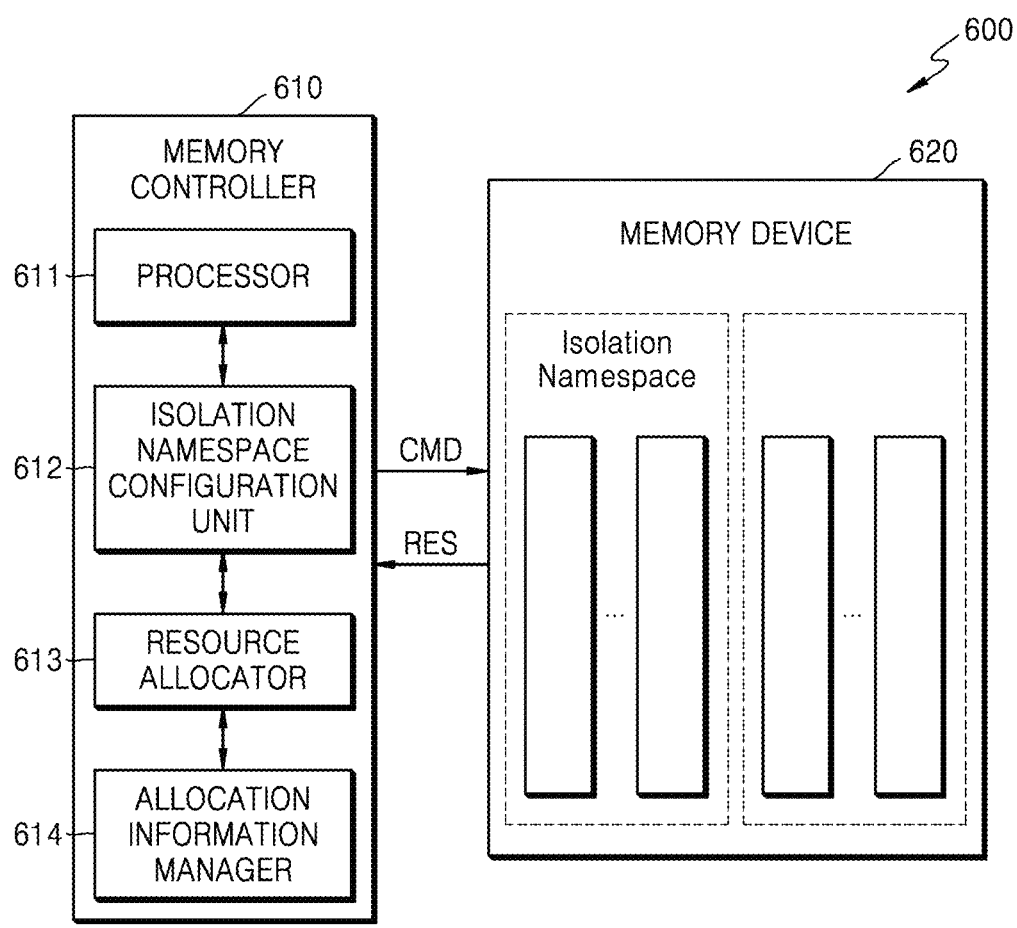
FIG. 9 is a block diagram illustrating implementation of a storage device, according to at least one example embodiment.

FIG. 9 is a block diagram illustrating implementation of a storage device, according to at least one example embodiment. FIG. 9 illustrates the case where resources of a storage device are allocated to users in various modes, but the example embodiments are not limited thereto.

A storage device 600 may include a memory controller 610 and a memory device 620, etc. The memory controller 610 may provide commands CMD of multiple users to the memory device 620 and may receive responses RES from the memory device 620, etc. In at least one example embodiment, the memory controller 610 may include at least one processor 611, an isolation namespace configuration unit 612, a resource allocator 613, and/or an allocation information manager 614, etc. The isolation namespace configuration unit 612, the resource allocator 613, and/or the allocation information manager 614 may each be implemented by hardware, or a combination of hardware and software. According to some example embodiments, the memory controller 610, at least one processor 611, isolation namespace configuration unit 612, resource allocator 613, and/or allocation information manager 614, etc., may be implemented as processing circuitry. The processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The memory device 620 may include at least two isolation namespaces. Each isolation namespace may include NAND chips (and/or dies, etc.) connected to at least two channels. Users allocated to the same isolation namespace may share resources, such as a NAND chip and a channel, which are included in the isolation namespace, but are not limited thereto. Additionally, users allocated to different isolation namespaces may independently use resources, such as separate NAND chips and separate channels, etc.

The processor 611 may generally control operations of the memory controller 610, but is not limited thereto. For example, the processor 611 may control an interface with a host, fetch the commands CMD from the host, and control execution of the commands CMD and memory operations of the memory device 620 according to the execution of the commands CMD, etc.

The isolation namespace configuration unit 612 may generate and manage isolation namespaces according to some example embodiments. For example, based on a result of the configuration of the isolation namespace configuration unit 612, the numbers of NAND chips and channels included in an isolation namespace may be determined. In some example embodiments, the isolation namespace configuration unit 612 may set the size of an isolation namespace based on information, such as the number of users accessing the memory device 620 and/or a performance bandwidth set for each user, etc., but is not limited thereto. For example, as described above, the isolation namespace configuration unit 612 may set the size of an isolation namespace small to increase user fairness and/or set the size of an isolation namespace large to provide high performance of the storage device 600, etc. In at least one example embodiment, the isolation namespace configuration unit 612 may monitor the access status of multiple users of the memory device 620 and dynamically change the size of an isolation namespace based on a result of the monitoring. Although one or more example embodiments described above illustrate the case where a plurality of isolation namespaces are configured to have the same size, the example embodiments are not limited thereto. Isolation namespaces may be configured in various sizes.

The resource allocator 613 may control resource allocation for users, according to some example embodiments. The resource allocator 613 may allocate one of a plurality of isolation namespaces to each user, according to some example embodiments. The resource allocator 613 may perform resource allocation based on a performance bandwidth set for each user such that each user is allocated a resource included in one isolation namespace. For example, when there are multiple users allocated to one isolation namespace, a resource allocation ratio for the isolation namespace may be set based on the priorities of the multiple users, etc.

According to some example embodiments, the resource allocator 613 may dynamically change the size of a resource allocated to each user, considering user fairness and/or the performance of the storage device 600, etc., but the example embodiments are not limited thereto. For example, as described above, the resource allocator 613 may change the size of a resource allocated to each user based on the usage status of other users who share an isolation namespace with the user, with respect to the storage device 600. For example, when a first user uses a first isolation namespace and other users allocated to the first isolation namespace do not and/or cannot access the storage device due to the first user, and/or the number of other users accessing the storage device is relatively small, a larger resource may be allocated to the first user compared to a performance bandwidth set and/or preset for the first user.

The allocation information manager 614 may manage information indicating the resource usage status of each user based on a result of the allocation by the resource allocator 613. For example, the allocation information manager 614 may manage information indicating a user's resource usage status based on a unit (e.g., a NAND chip, die, etc.) constituting and/or included in an isolation namespace. The resource allocator 613 may dynamically change resource allocation for each user by referring to the information managed by the allocation information manager 614, etc.

FIGS. 10 to 13B are diagrams illustrating examples of resource allocation and information management, according to some example embodiments. FIGS. 10 to 13B illustrate an example case where one isolation namespace includes first to fourth dies DIE1 to DIE4, of which each is connected to one of first and second channels CH1 and CH2, but the example embodiments are not limited thereto. FIGS. 10 to 13B also illustrate the case where each channel corresponds to two ways, but the example embodiments are not limited thereto. For example, each die may constitute a way. The first to fourth dies DIE1 to DIE4 may respectively correspond to first to fourth ways WAY1 to WAY4, but are not limited thereto.

Each die may include a plurality of blocks. At least one block in one die may be allocated to each user, and multiple users may be allocated to different blocks. Assuming that an isolation namespace is allocated to first and second users User1 and User2, resources of the isolation namespace may be allocated to the first and second users User1 and User2 at a ratio of performance bandwidths respectively set for the first and second users User1 and User2. As described above, considering user fairness and/or the performance of a storage device, a resource allocated to each of the first and second users User1 and User2 may be dynamically changed.

As an example of information management, first information, second information, and/or third information may be defined, etc. The first information (e.g., a way user count) may indicate the number of users using each way. The second information (e.g., a currently using way) may indicate a way that a user is currently using. The third information (e.g., a done way) may indicate a way that may no longer be used among the ways of an isolation namespace which are allocated to a user because all of the blocks of the way have been used. Regarding an isolation namespace, the first information (e.g., the way user count) may be managed in common for multiple users, and the second information (e.g., the currently using way) and the third information (e.g., the done way) may be managed separately for each user.

In describing some example embodiments of FIGS. 10 to 13B, it is assumed that a resource occupancy ratio between the first user User1 and the second user User2 is set to 1:3 based on the priorities of the first user User1 and the second user User2, but the example embodiments are not limited thereto. Each piece of the first to third information may include field values respectively corresponding to the ways of an isolation namespace, for example, first to fourth field values respectively corresponding to four ways, etc. In some example embodiments of FIGS. 10 to 13B, an operation of accessing an isolation namespace may correspond to a data write operation, but the example embodiments are not limited thereto.

Figure 10:
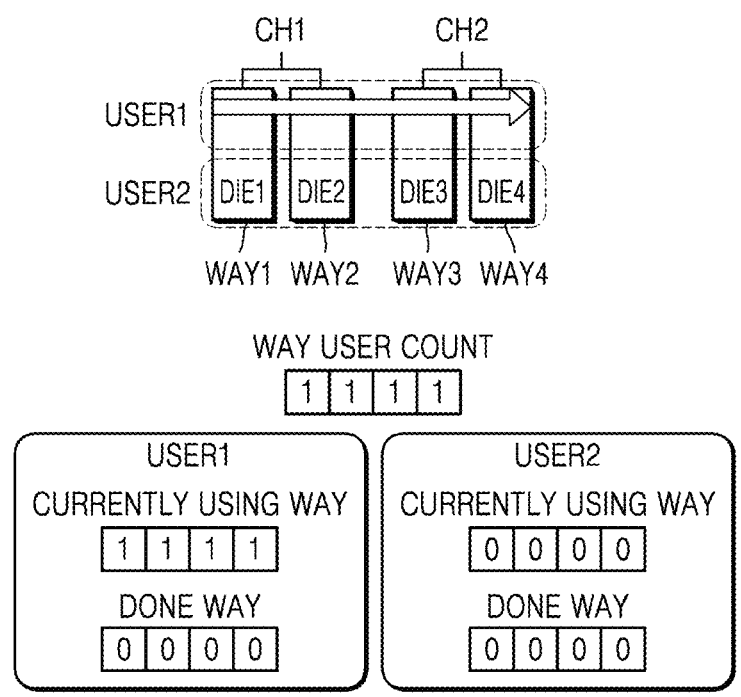
FIGS. 10 to 13B are diagrams illustrating examples of resource allocation and information management, according to some example embodiments.

Referring to FIG. 10, as access to the storage device is requested by the first user User1, blocks of at least one way may be allocated to the first user User1, but the example embodiments are not limited thereto. In the case where no other users access an isolation namespace, the blocks of all ways of the isolation namespace may be allocated to the first user User1 regardless of a performance bandwidth set for the first user User1. Accordingly, the blocks of all ways of the isolation namespace may be being used, and the first to fourth field values of the first information (e.g., the way user count) may all be "1" indicating that the number of users is one. Because the first user User1 is using all of the first to fourth ways, the first to fourth field values of the second information (e.g., the currently using way) may all be "1" indicating that the first user User1 is using a way.

Figure 11A:
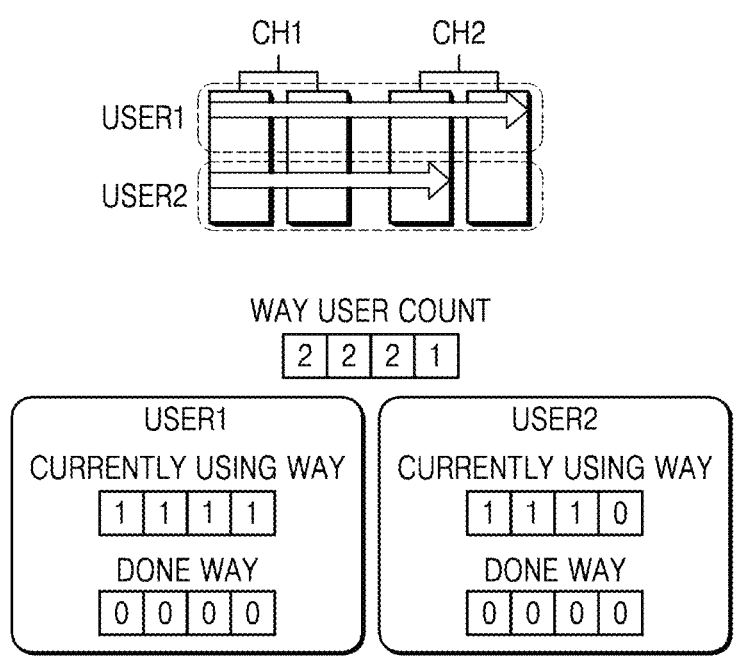
Figure 11B:
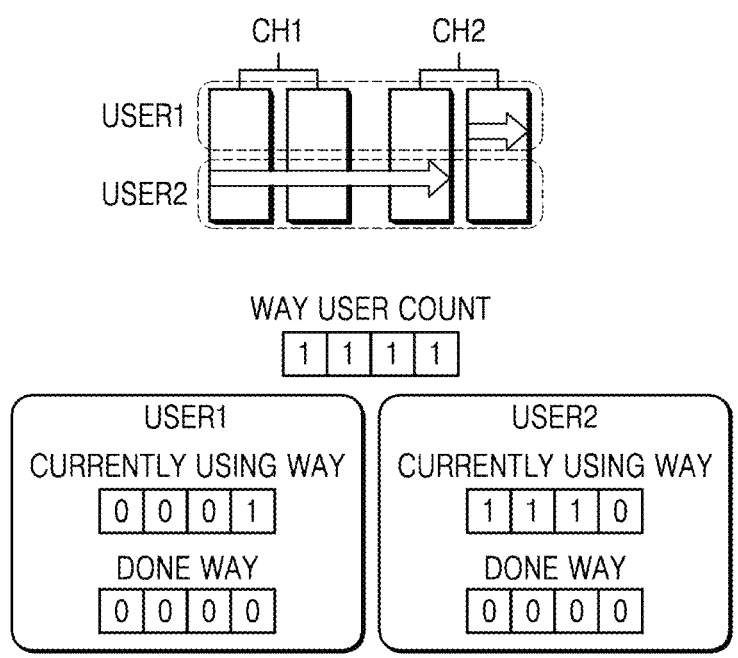

FIGS. 11A and 11B illustrate an example case where the second user User2 accesses the isolation namespace. Referring to FIG. 11A, as the first user User1 is using the isolation namespace when the second user User2 requests access to the isolation namespace, blocks of three ways (e.g., the first to third ways) may be allocated to the second user User2 based on a performance bandwidth set and/or preset for the second user User2, but the example embodiments are not limited thereto. In addition, the first user User1 may be using the first to fourth ways for a memory operation (e.g., a page-wise write operation, etc.) currently being performed but which has not yet been completed. Accordingly, the first to third ways among the first to fourth ways in the isolation namespace may be allocated to both the first user User1 and the second user User2, and the first to third field values of the first information (e.g., the way user count) may be changed to "2". The first to third field values of the second information (e.g., the currently using way) of the second user User2 may be changed to "1".

Referring to FIG. 11B, the memory operation requested by the first user User1 may be completed and only one way may be allocated to the first user User1 according to the performance bandwidth set and/or preset for the first user User1. Accordingly, the remaining three ways may be deallocated by the storage device. At this time, to reduce the number of ways allocated to both the first user User1 and the second user User2, the second information (e.g., the currently using way) of the second user User2 may be referred to in deallocating the ways that have been allocated to the first user User1. Accordingly, the first to third ways may be deallocated from the first user User1. In this case, the first to third field values of the first information (e.g., the way user count) may be changed to "1" and the first to third field values of the second information (e.g., the currently using way) of the first user User1 may be changed to "0".

Although it has been described in the example above that way deallocation for the first user User1 is performed after the memory operation requested by the first user User1 has been completed, the example embodiments are not limited thereto. For example, when way allocation to the first user User1 needs to be released based on fairness factors and/or considerations among multiple users, way deallocation may be performed before the memory operation has been completed.

Figure 12A:
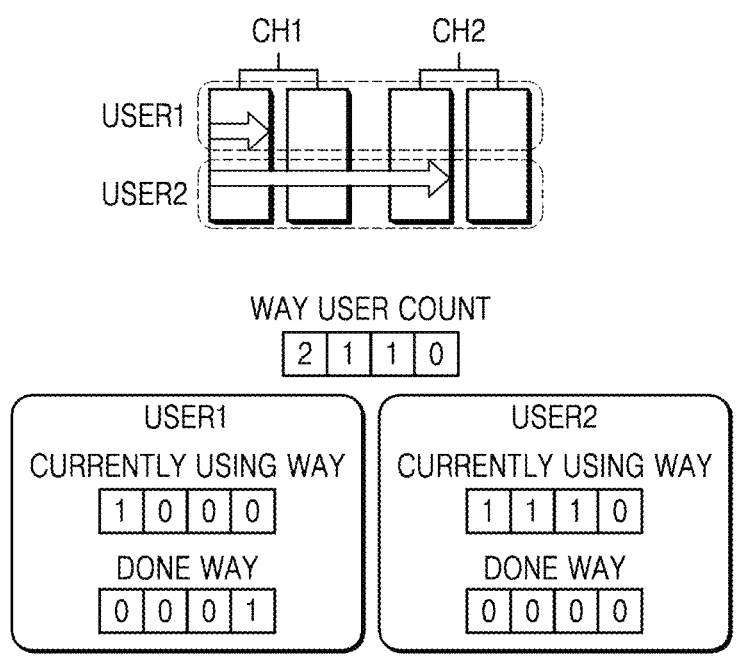
Figure 12B:
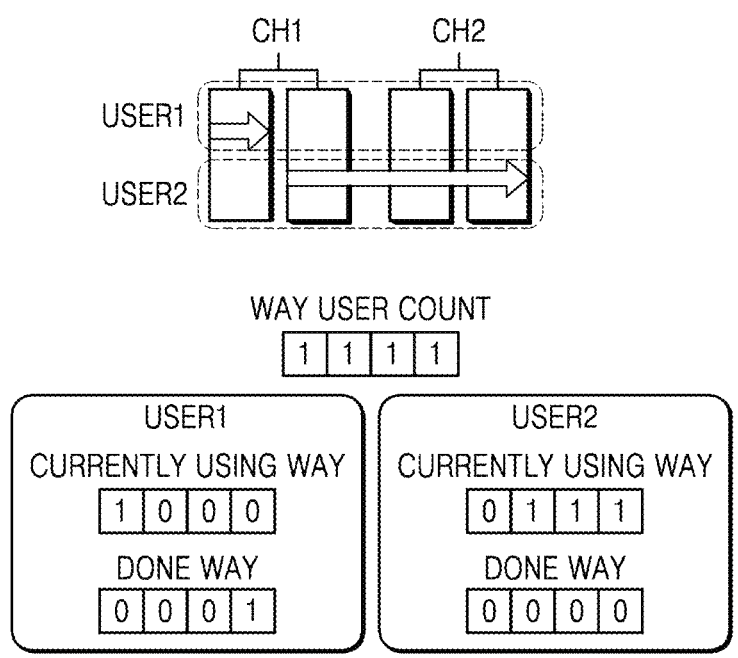

FIGS. 12A and 12B illustrate an example of changing allocation when a way allocated to the first user User1 has been exhausted. For example, when a way allocated to a user is exhausted as data has been written to all blocks included in the way, the storage device may allocate another way to the user, etc.

Referring to FIG. 12A, as the fourth way allocated to the first user User1 is exhausted, the allocation of the fourth way to the first user User1 may be released. Any one (e.g., the first way) of the remaining ways may be allocated to the first user User1 and memory operations requested by the first user User1 may be performed and/or continuously performed on the memory blocks of the first way. For example, because the remaining first to third ways excluding the fourth way are all used by the second user User2, when a new way is allocated to the first user User1, any one of the first to third ways may be allocated to the first user User1. If there is a way that is not being used by other users at the time of allocating a new way to the first user User1, the way may be preferentially allocated to the first user User1.

According to the allocation result illustrated in FIG. 12A, the first field value of the first information (e.g., the way user count) may be changed to "2", the first field value of the second information (e.g., the currently using way) of the first user User1 may be changed to "1", and the fourth field value of the second information (e.g., the currently using way) of the first user User1 may be changed to "0". As the first user User1 exhausts the fourth way, the fourth field value of the third information (e.g., the done way) of the first user User1 may be changed to "1".

Referring to FIG. 12B, to reduce cases where a particular way is simultaneously allocated to multiple users, the storage device may determine whether there is a way that is not allocated to other users at the time when the memory operation requested by the second user User2 is completed. For example, when the storage device determines that the fourth way is not allocated to any user, the storage device may deallocate the first way from the second user User2 and may newly allocate the fourth way to the second user User2, etc.

According to the change in the allocation as shown in FIG. 12B, the first to fourth field values of the first information (e.g., the way user count) may all be "1". In addition, the first field value of the second information (e.g., the currently using way) of the second user User2 may be changed to "0" and the fourth field value of the second information (e.g., the currently using way) of the second user User2 may be changed to "1".

Figure 13A:
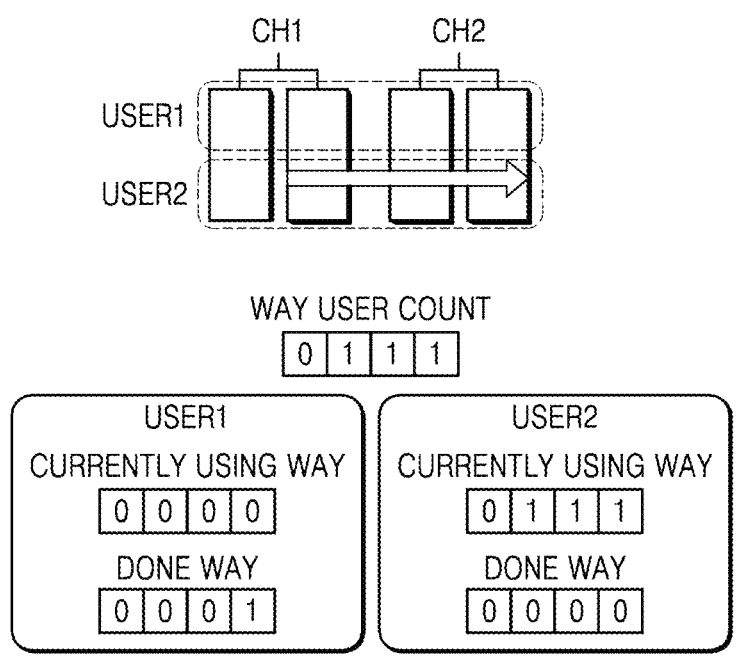
Figure 13B:
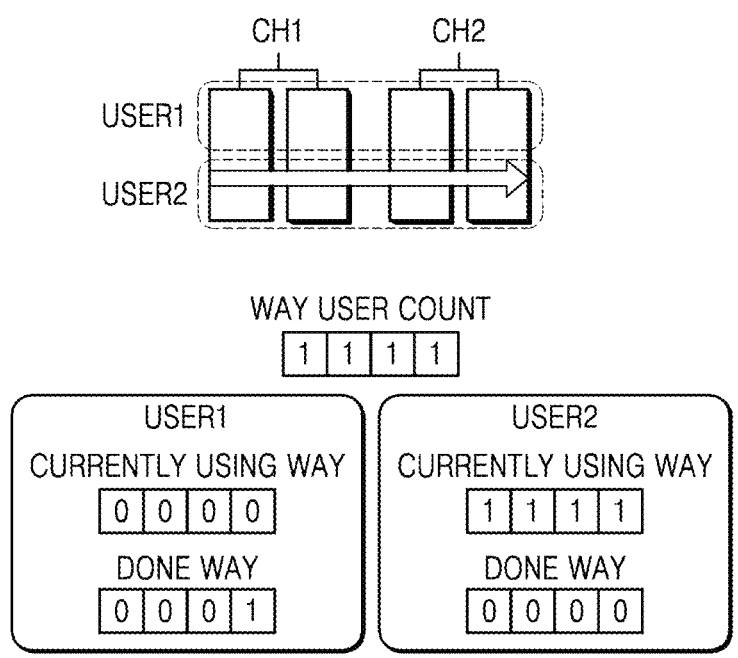

FIGS. 13A and 13B illustrate an example case where the access of the first user User1 to the storage device has been completed. For example, because the first user User1 no longer accesses the storage device, the first way may be deallocated from the first user User1, as shown in FIG. 13A. In this case, the first field value of the first information (e.g., the way user count) may be changed to "0" and the first field value of the second information (e.g., the currently using way) of the first user User1 may be changed to "0".

Thereafter, as shown in FIG. 13B, all ways in the isolation namespace may be allocated to the second user User2. For example, the first way may also be allocated to the second user User2. Accordingly, the first field value of the first information (e.g., the way user count) may be changed to "1" and the first field value of the second information (e.g., the currently using way) of the second user User2 may be changed to "1".

Although allocation of the isolation namespace is performed with respect to the first and second users User1 and User2 in the example embodiment described above, the example embodiments are not limited thereto. For example, when multiple users are allocated to an isolation namespace, the way allocation described above may be carried out by determining the number of users currently using the isolation namespace and determining a way that is currently allocated to the least number of users, etc.

Figure 14:
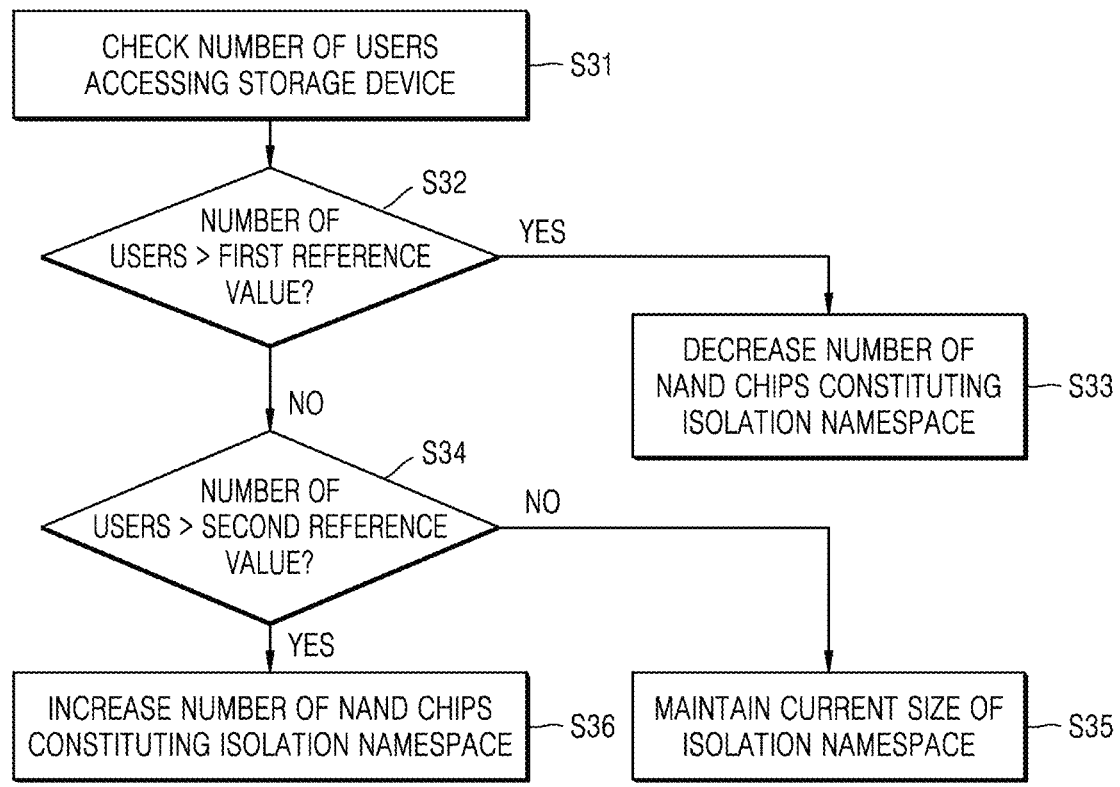
FIG. 14 is a flowchart of an operating method of a storage device, according to at least one example embodiment.

FIG. 14 is a flowchart of an operating method of a storage device, according to at least one example embodiment.

Referring to FIG. 14, the size of an isolation namespace may be dynamically adjusted according to and/or based on the number of users currently using the storage device. The storage device may determine the number of users accessing the storage device through commands provided by the users and may check the number of users currently accessing the storage device by determining a user that has not provided a command during a certain and/or desired time period in operation S31. The number of users may be compared with a first reference value in operation S32. When the number of users is equal to and/or greater than the first reference value (e.g., first threshold value), in order to increase fairness among multiple users, the storage device may decrease the size of the isolation namespace by decreasing the number of NAND chips included in the isolation namespace in operation S33.

When the number of users is less than the first reference value, the number of users may be compared with a second reference value (e.g., second threshold value) that is less than the first reference value in operation S34. When the number of users is not less than the second reference value, the storage device may maintain the current size of the isolation namespace, without changing the configuration of the isolation namespace, in operation S35. Otherwise, when the number of users is less than the second reference value, to increase the disk performance provided to each user, the storage device may increase the size of the isolation namespace by increasing the number of NAND chips included in the isolation namespace in operation S36.

Figure 15:
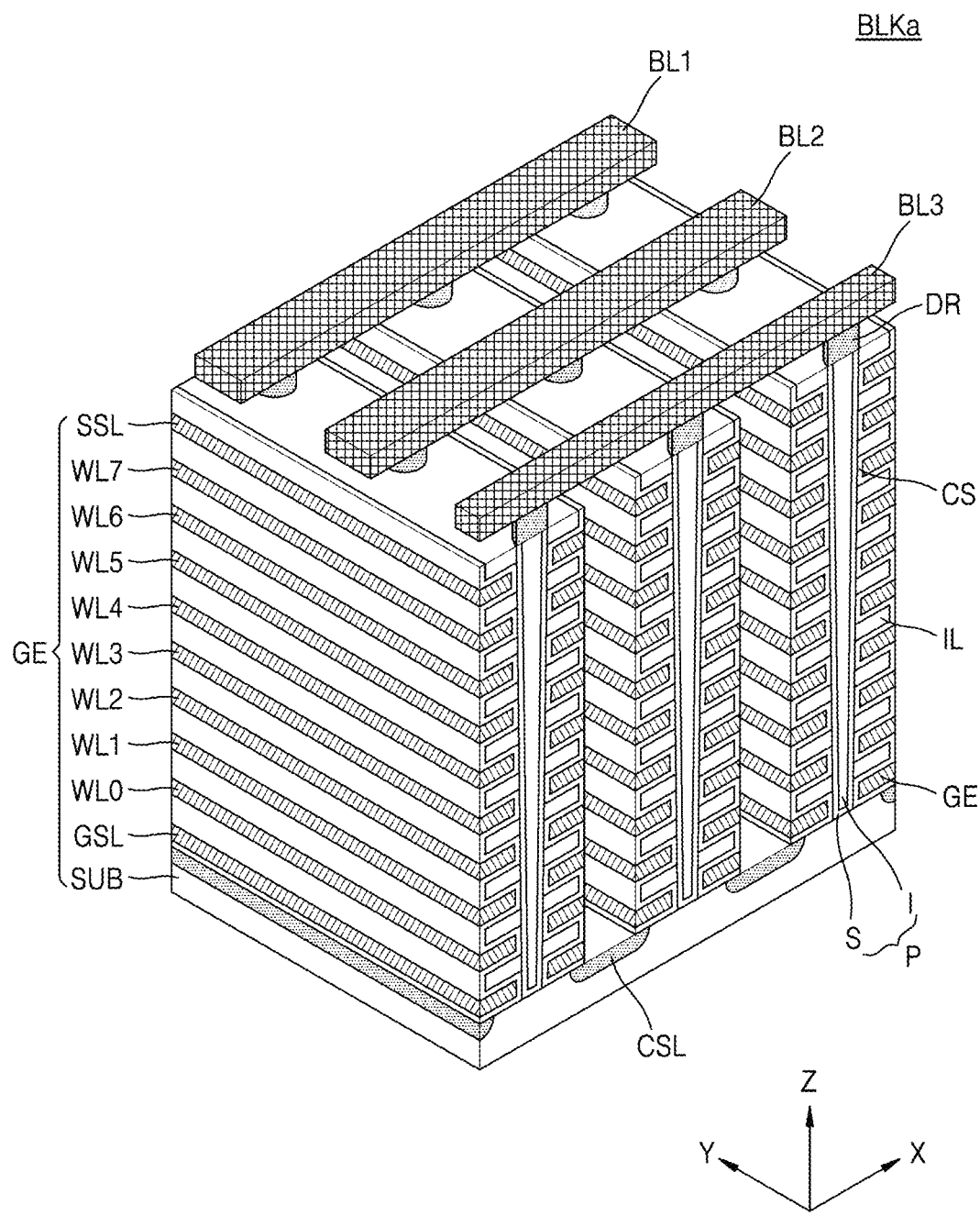
FIG. 15 is a perspective view illustrating implementation of a block included in non-volatile memory.

FIG. 15 is a perspective view illustrating an example implementation of a block included in a NVM. FIG. 15 illustrates one of a plurality of blocks included in the cell array 221 in FIG. 1, but the example embodiments are not limited thereto.

Referring to FIG. 15, a memory block BLKa is formed in a direction perpendicular to a surface of a substrate SUB. The substrate SUB has a first conductivity type (e.g., a p-type, etc.). A common source line CSL extends on the substrate SUB in a second direction, e.g., a horizontal direction, Y, (e.g., a direction horizontal to the surface of the substrate SUB) and is doped with impurities of a second conductivity type (e.g., an n-type, etc.). On a region of the substrate SUB between two adjacent common source lines CSL, a plurality of insulating layers IL extend in the second horizontal direction Y and are sequentially provided in a vertical direction Z. The insulating layers IL are separated from each other by a certain and/or desired distance in the vertical direction Z. For example, the insulating layers IL may include at least one insulating material such as silicon oxide, etc.

On the region of the substrate SUB between two adjacent common source lines CSL, a plurality of pillars P pass through the insulating layers IL in the vertical direction Z. A plurality of pillars P are arranged in a first horizontal direction X, e.g., a direction horizontal to the surface of the substrate SUB. For example, the pillars P pass through the insulating layers IL to be in contact with the substrate SUB. In detail, a surface layer S of each pillar P may include at least one silicon material of the first conductivity type and may function as a channel region. An inner layer I of each pillar P may include at least one insulating material, such as silicon oxide and/or an air gap, etc.

In the region between two adjacent common source lines CSL, a charge storage layer CS is provided along the exposed surfaces of the insulating layers IL, the pillars P, and the substrate SUB. The charge storage layer CS may include a gate insulating layer (which may be referred to as a "tunneling insulating layer"), a charge trap layer, and/or a blocking insulating layer, etc. For example, the charge storage layer CS may have an oxide-nitride-oxide (ONO) structure, but is not limited thereto. In the region between two adjacent common source lines CSL, gate electrodes GE, such as a ground select line GSL, a string select line SSL, and word lines WL0 to WL7, are provided on an exposed surface of the charge storage layer CS, etc.

Drains and/or drain contacts DR may be respectively provided on the pillars P. For example, the drains and/or drain contacts DR may include a silicon material doped with impurities of the second conductivity type, but is not limited thereto. Bit lines BL1 to BL3 may extend on the drains DR in the first horizontal direction X and may be separated from each other by a certain and/or desired distance in the second horizontal direction Y.

Figure 16:
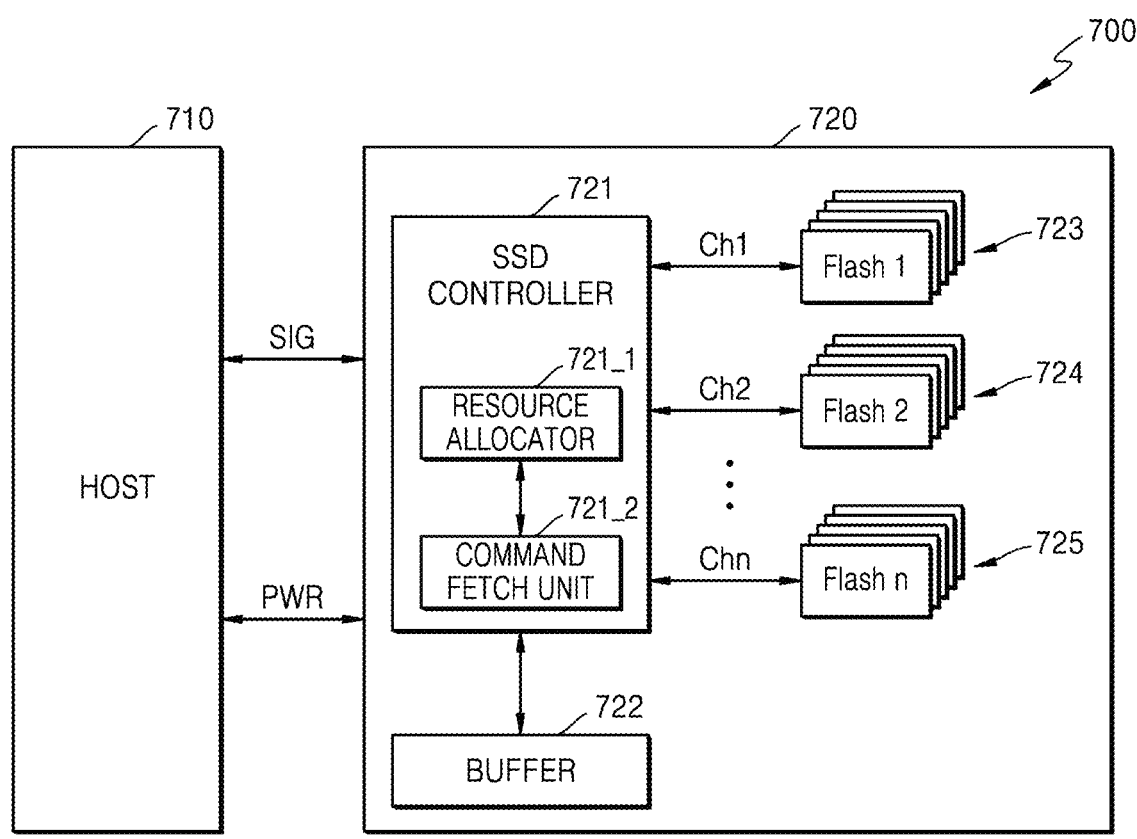
FIG. 16 is a block diagram illustrating the case where a solid state drive (SSD) is applied to a storage device in a data processing system, according to some example embodiments.

FIG. 16 is a block diagram illustrating an example case where an SSD is applied to a storage device in a data processing system, according to some example embodiments.

Referring to FIG. 16, a data processing system 700 may include at least one host 710 (e.g., a host device, a host computing device, etc.) and an SSD 720, etc., but the example embodiments are not limited thereto. The SSD 720 may exchange one or more signals SIG with the host 710 and/or receive power PWR from the host 710, etc. The SSD 720 may include, e.g., an SSD controller 721, a buffer 722, and/or a plurality of NVM devices, e.g., NVM devices 723 to 725 (Flash 1~Flash n), but the example embodiments are not limited thereto. The SSD controller 721 may communicate with the NVM devices 723 to 725 respectively through a plurality of channels Ch1 to Chn. The SSD 720 may be implemented using one or more of the example embodiments described above with reference to FIGS. 1 to 15. In other words, the SSD controller 721 may include, e.g., a resource allocator 721_1 and/or a command fetch unit 721_2, etc. The resource allocator 721_1 may control resource allocation for multiple users (e.g., a plurality of users) accessing the SSD 720, based on performance bandwidths respectively set for the multiple users. The buffer 722 in FIG. 16 may correspond to a resource, of which the allocation is controlled according to one or more of the example embodiments. The storage space of the buffer 722 may be allocated to the multiple users at a certain and/or desired ratio under control of the resource allocator 721_1, but is not limited thereto.

While various example embodiments of the inventive concepts have been particularly shown and described herein, it will be understood that various changes in form and details may be made therein without departing from the spirit and scope of the following claims.

What is claimed is:

1. A memory controller, the memory controller comprising:
    processing circuitry configured to:
        set a resource allocation ratio for multiple users of at least one host device;
        allocate a plurality of resources to the multiple users based on the resource allocation ratio, the plurality of resources being usable by the multiple users to access a memory device,
        wherein the plurality of resources include a plurality of independent resource type resources and at least one shared resource type resource, and
        wherein allocating the plurality of resources includes:
            allocating separate independent resource type resources of the plurality of independent resource type resources to different ones of the multiple users based on the resource allocation ratio, and
            allocating the at least one shared resource type resource among the multiple users in a time-division manner, wherein allocating the at least one shared resource type resource in the time-division manner comprises allocating the at least one shared resource type resource to a first user of the multiple users for a first time period, and allocating the at least one shared resource type resource to a second user of the multiple users for a second time period, wherein relative durations of the first time period and the second time period are based on the resource allocation ratio; and
        perform a fetch operation on memory commands using the allocated plurality of resources to the multiple users, wherein the memory commands are generated by one or more users of the multiple users.

2. The memory controller of claim 1, wherein the processing circuitry is further configured to:
    store the memory commands fetched from the host device in storage space of the memory controller associated with each of the multiple users, wherein separation portions of the storage space are allocated to different ones of the multiple users based on the resource allocation ratio.

3. The memory controller of claim 2, wherein the processing circuitry is further configured to:
perform fetch scheduling on the memory commands generated by the one or more users, wherein performing the fetch scheduling includes controlling a number of fetched commands with respect to each user of the multiple users based on the resource allocation ratio.

4. The memory controller of claim 1, wherein the processing circuitry is further configured to:
store data provided by the multiple users in a first buffer included in the memory controller or a second buffer external to the memory controller; and
allocate storage space in the first buffer or the second buffer to the multiple users based on the resource allocation ratio.

5. The memory controller of claim 1, wherein the processing circuitry is further configured to:
set a performance bandwidth for each user of the multiple users, the performance bandwidth being for performance of memory access operations to the memory device; and
set the resource allocation ratio based on the performance bandwidth set for each user of the multiple users.

6. The memory controller of claim 5, wherein the processing circuitry is further configured to:
receive a first memory command or a second memory command from the host device, wherein the first memory command comprises a request for resource allocation of a storage region of a cell array of the memory device to the multiple users, and wherein the second memory command comprises a resource allocation command agreed upon between the host device and the memory controller; and
set the performance bandwidth for each user of the multiple users based on size information of the storage region included in the first memory command or based on performance bandwidth information included in the second memory command.

7. The memory controller of claim 1, further comprising:
working memory configured to store software executable by the processing circuitry, the software including a flash translation layer for management of the memory device,
wherein the processing circuitry is configured to process execution of the memory commands generated by the one or more users in the time-division manner based on the resource allocation ratio.

8. The memory controller of claim 7, wherein the working memory is configured to:
store mapping information indicating a mapping between user identification (ID) information associated with each user of the multiple users and locations of storage regions of a cell array of the memory device, the storage regions of the cell array being allocated among the multiple users,
wherein the locations of the storage regions correspond to locations of memory chips or dies in the memory device.

9. The memory controller of claim 1, wherein the processing circuitry is configured to:
generate first and second isolation namespaces based on a request from the host device,
wherein each of the first and second isolation namespaces includes a plurality of dies included in the memory device; and
use a resource related to a memory operation in the first isolation namespace independently from a resource related to the memory operation in the second isolation namespace.

10. The memory controller of claim 9, wherein
the first isolation namespace is allocated to first to N-th users, where N is an integer of at least 1; and
the processing circuitry is configured to allocate the plurality of dies of the first isolation namespace to the first to N-th users based on a resource allocation ratio set for the first to N-th users.

11. The memory controller of claim 10, wherein
the first to N-th users share a first channel included in the first isolation namespace; and
the processing circuitry is configured to allocate the first channel to the first to N-th users in the time-division manner based on the resource allocation ratio set for the first to N-th users.

12. The memory controller of claim 10, wherein the first isolation namespace is allocated to the first user and the second user, and
the processing circuitry is further configured to:
allocate all of the plurality of dies included in the first isolation namespace to the first user based on the second user not accessing the first isolation namespace, and
allocate a subset of the plurality of dies included in the first isolation namespace to the first user based on a resource allocation ratio set for the first and second users, based on the second user accessing the first isolation namespace.

13. The memory controller of claim 9, wherein the processing circuitry is configured to:
decrease a number of the plurality of dies included in each of the first and second isolation namespaces based on a number of users accessing the memory device increasing; and
increase the number of the plurality of dies included in each of the first and second isolation namespaces based on the number of users accessing the memory device decreasing.

14. An operating method of a memory controller, the operating method comprising:
allocating separate portions of command storage space, separate portions of data buffer space, and separate memory chips of a memory device to different ones of multiple users based on a resource allocation ratio set for the multiple users;
storing memory commands associated with each user of the multiple users in the separate portion of the command storage space allocated to each user of the multiple users, the memory commands being fetched from a host device;
storing data from each user of the multiple users in the separate portion of the data buffer space allocated to each user of the multiple users; and
writing the data stored in the separate portion of the data buffer space allocated to each user of the multiple users to the separate memory chips allocated to each user of the multiple users using a first memory channel,
wherein writing the data to the separate memory chips comprises allocating the first memory channel among the multiple users in a time-division manner, wherein allocating the first memory channel in the time-division manner comprises allocating the first memory channel to a first user of the multiple users for a first time period, and allocating the first memory channel to a second user of the multiple users for a second time period, wherein relative durations of the first time period and the second time period are based on the resource allocation ratio.

15. The operating method of claim 14, further comprising:

receiving a first memory command from the host device, the first memory command requesting allocation of a storage region on the memory device among the multiple users;

setting a performance bandwidth for each user of the multiple users based on information indicating to a size of a portion of the storage region allocated to each user of the multiple users, the information being included in the first memory command; and setting the resource allocation ratio for the multiple users based on the performance bandwidth set for each user of the multiple users.

16. The operating method of claim 14, further comprising:

processing execution of memory commands from the multiple users in the time-division manner based on the resource allocation ratio.

17. The operating method of claim 14, further comprising:

generating first and second isolation namespaces, each of the first and second isolation namespaces having at least one independent resource type resource, the at least one independent resource type resource being usable for a memory operation, and each of the first and second isolation namespaces including at least two memory chips among the memory chips of the memory device; and allocating the first isolation namespace to the first user and the second user the multiple users, wherein the at least one independent resource type resource in the first isolation namespace is allocated among the first and second users based on a resource allocation ratio between the first and second users.

18. The operating method of claim 17, further comprising:

based on the second user not accessing the first isolation namespace, allocating all memory chips included in the first isolation namespace to the first user; and based on the second user accessing the first isolation namespace, allocating a subset of the memory chips included in the first isolation namespace to the first user based on the resource allocation ratio between the first and second users.

19. A storage device comprising:

a memory device, the memory device including a first isolation namespace and a second isolation namespace, each of the first and second isolation namespaces including a plurality of memory chips, wherein at least one resource of the first isolation namespace is accessible independently from resources of the second isolation namespace, wherein the at least one resource of the first isolation namespace and the resources of the second isolation namespace are usable for at least one memory operation of the memory device, and wherein each of the first and second isolation namespaces includes at least one independent resource type resource; and processing circuitry configured to:

communicate with a host device and control the at least one memory operation of the memory device in response to memory commands from multiple users of the host device, the multiple users including a first user and a second user, based on the second user not accessing the first isolation namespace, allocate all memory chips included in the first isolation namespace to the first user, and based on the second user accessing the first isolation namespace, allocate a subset of the memory chips included in the first isolation namespace to the first user based on a resource allocation ratio between the first user and the second user.

20. The storage device of claim 19, wherein the processing circuitry is configured to:

set the resource allocation ratio for the multiple users;

allocate the plurality of memory chips among the multiple users based on the resource allocation ratio;

control a fetch operation to be performed on the memory commands based on the resource allocation ratio; and modify allocation of the plurality of memory chips for the first and second users based on use of the storage device by a third user.

* * * * *